(12) United States Patent
Sullivan et al.

(10) Patent No.: US 8,881,476 B2
(45) Date of Patent: Nov. 11, 2014

(54) PANELS HAVING MULTIPLE CHANNEL STRUCTURES

(75) Inventors: Michael G. Sullivan, Prescott, AZ (US); Diane M. Reker, Prescott, AZ (US); Bruce B. Solper, Skull Valley, AZ (US)

(73) Assignee: BTU Comfort Systems, LLC., Prescott, AZ (US)

( * ) Notice: Subject to any disclaimer, the term of this patent is extended or adjusted under 35 U.S.C. 154(b) by 137 days.

(21) Appl. No.: 13/093,517

(22) Filed: Apr. 25, 2011

(65) Prior Publication Data

US 2012/0267067 A1 Oct. 25, 2012

(51) Int. Cl.
*E04C 2/52* (2006.01)
*F24D 3/16* (2006.01)
*F16L 3/13* (2006.01)
*F24D 3/14* (2006.01)
*F24F 5/00* (2006.01)
*F28D 1/047* (2006.01)
*B26F 3/12* (2006.01)
*B26D 3/00* (2006.01)
*F28D 20/02* (2006.01)
*E04B 1/26* (2006.01)

(52) U.S. Cl.
CPC . *F16L 3/13* (2013.01); *F24D 3/141* (2013.01); *F24F 5/0089* (2013.01); *F28D 1/0477* (2013.01); *B26F 3/12* (2013.01); *Y02E 60/145* (2013.01); *E04B 1/26* (2013.01); *B26D 3/006* (2013.01); *F28D 20/023* (2013.01); *F24F 2005/0064* (2013.01)
USPC ............................................. 52/220.3; 165/56

(58) Field of Classification Search
CPC .................................. E04B 5/78; F24D 3/165

USPC ............ 52/220.1, 220.2, 220.3, 220.7, 220.8, 52/302.1, 302.3, 389, 390; 165/49, 56, 165/171
See application file for complete search history.

(56) References Cited

U.S. PATENT DOCUMENTS

| | | | | |
|---|---|---|---|---|
| 2,722,732 | A * | 11/1955 | Sandberg | 29/890.038 |
| 4,338,994 | A * | 7/1982 | Hewing et al. | 165/49 |
| 4,576,221 | A | 3/1986 | Fennesz | |
| 4,624,242 | A | 11/1986 | McCall | |
| 4,635,710 | A * | 1/1987 | Shelley | 165/49 |
| 4,766,951 | A | 8/1988 | Bergh | |
| 4,865,120 | A * | 9/1989 | Shiroki | 165/56 |
| 4,910,935 | A * | 3/1990 | Leukel et al. | 52/144 |
| 5,078,203 | A * | 1/1992 | Shiroki | 165/56 |

(Continued)

FOREIGN PATENT DOCUMENTS

EP 44985 A1 * 2/1982 ............ F16B 2/22

*Primary Examiner* — Jeanette E Chapman
*Assistant Examiner* — James Buckle, Jr.
(74) *Attorney, Agent, or Firm* — Robert D. Atkins; Atkins and Associates, P.C.

(57) ABSTRACT

A panel includes an insulating material, first channels disposed in a first surface of the insulating material, and second channels disposed in the first surface of the insulating material. The second channels are disposed at a first angle relative to the first channels. Additionally, the first channels and second channels are arranged such that each of the first channels is substantially parallel to the other first channels and each of the second channels is substantially parallel to the other second channels. The panel further includes a first retention clip disposed in one of the first channels. The first retention clip is configured to suspend an object having a substantially round cross-section within the one of the first channels. The first retention clip is further configured to prevent the object from contacting walls of the one of the first channels.

25 Claims, 23 Drawing Sheets

(56) References Cited

U.S. PATENT DOCUMENTS

| | | | |
|---|---|---|---|
| 5,292,065 A | 3/1994 | Fiedrich | |
| 5,454,428 A * | 10/1995 | Pickard et al. | 165/49 |
| 5,477,848 A | 12/1995 | Reed | |
| 5,579,996 A * | 12/1996 | Fiedrich | 237/69 |
| 5,743,330 A | 4/1998 | Bilotta et al. | |
| 5,788,152 A | 8/1998 | Alsberg | |
| 5,862,854 A * | 1/1999 | Gary | 165/55 |
| 5,930,962 A | 8/1999 | Sokolean | |
| 5,931,381 A * | 8/1999 | Fiedrich | 237/69 |
| 6,073,407 A | 6/2000 | Sokolean | |
| 6,533,185 B1 * | 3/2003 | Muir | 237/69 |
| 6,969,832 B1 * | 11/2005 | Daughtry, Sr. | 219/531 |
| 7,021,372 B2 | 4/2006 | Pickard | |

* cited by examiner

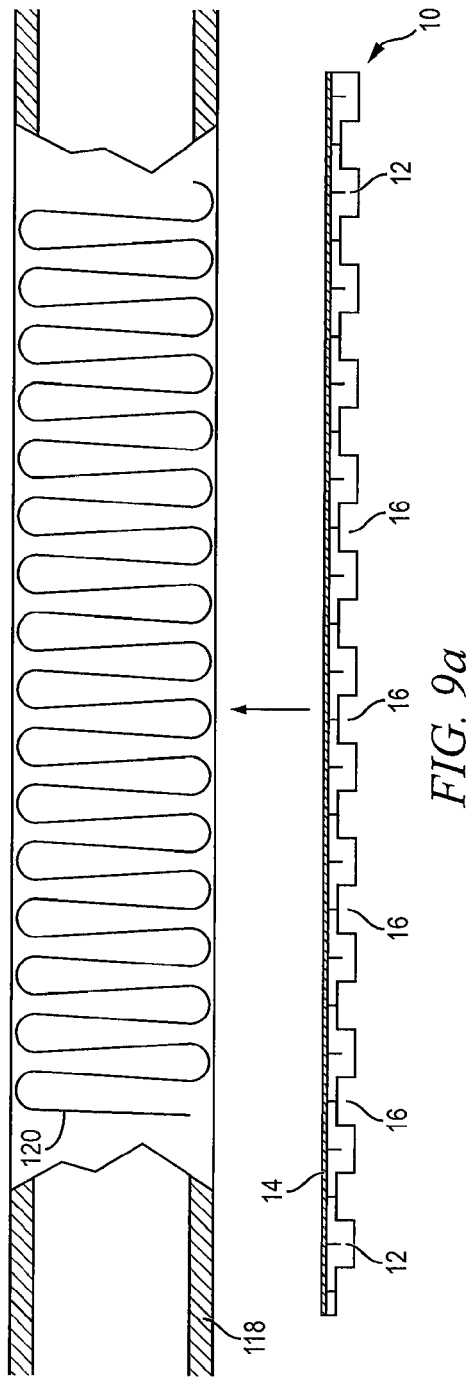
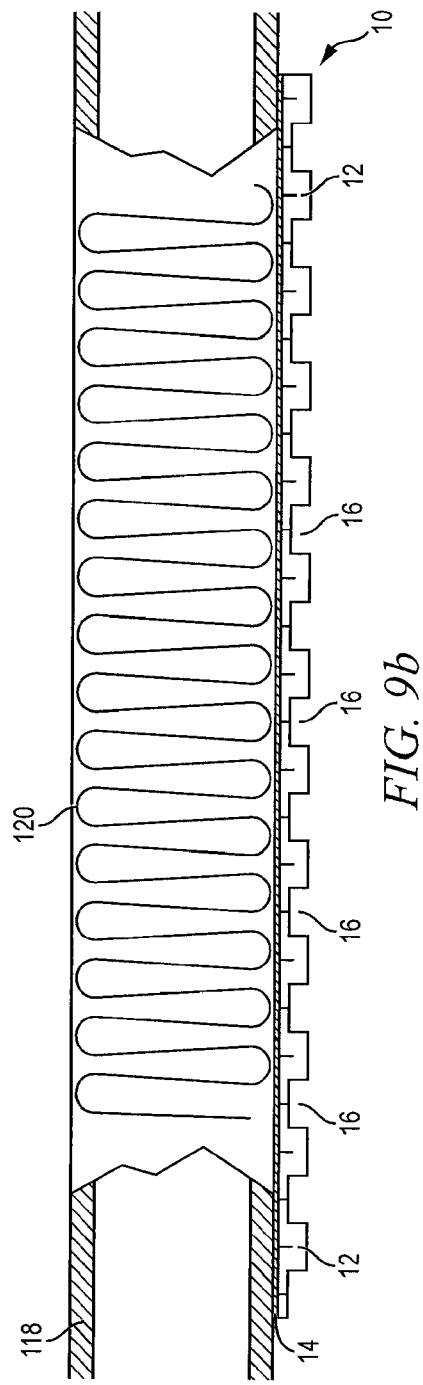
FIG. 9a
FIG. 9b

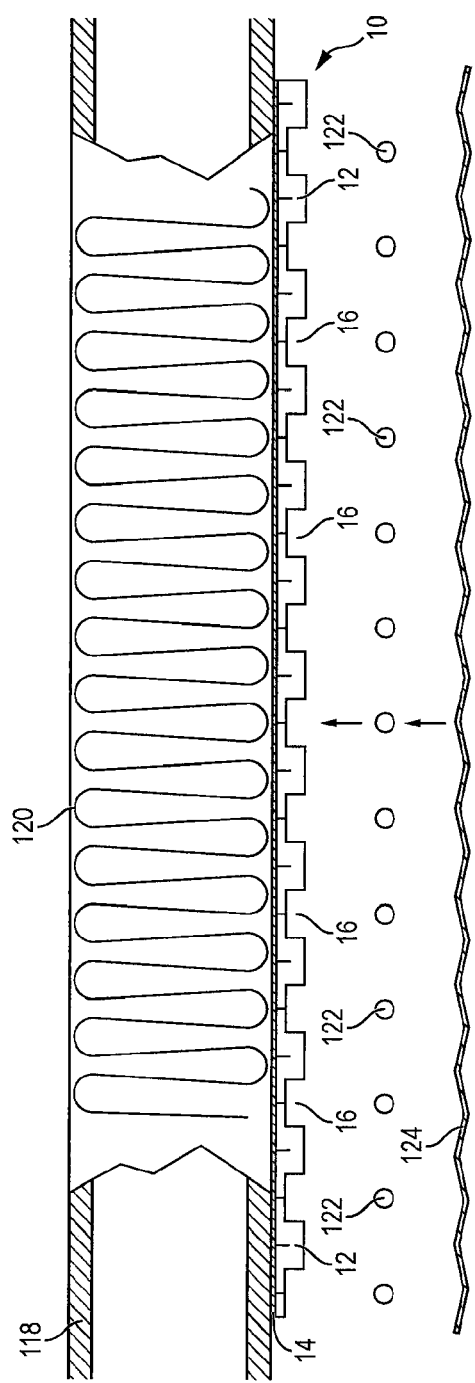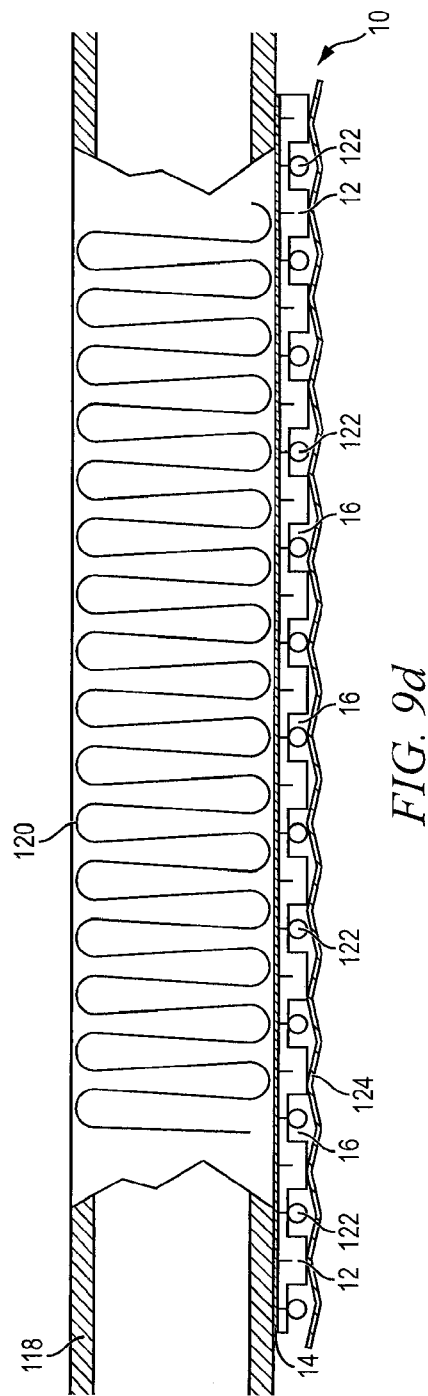

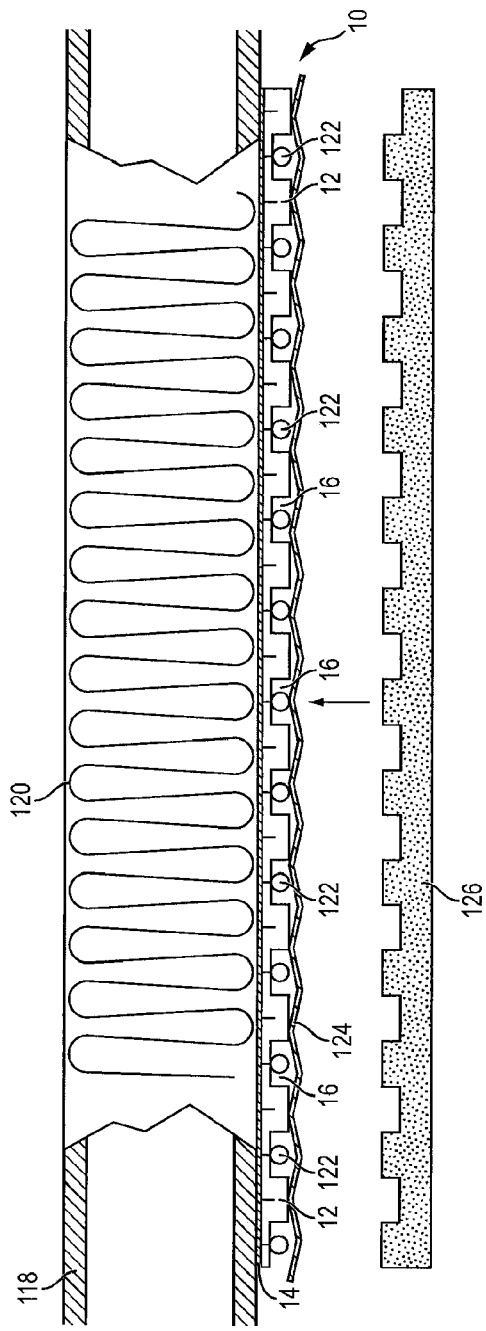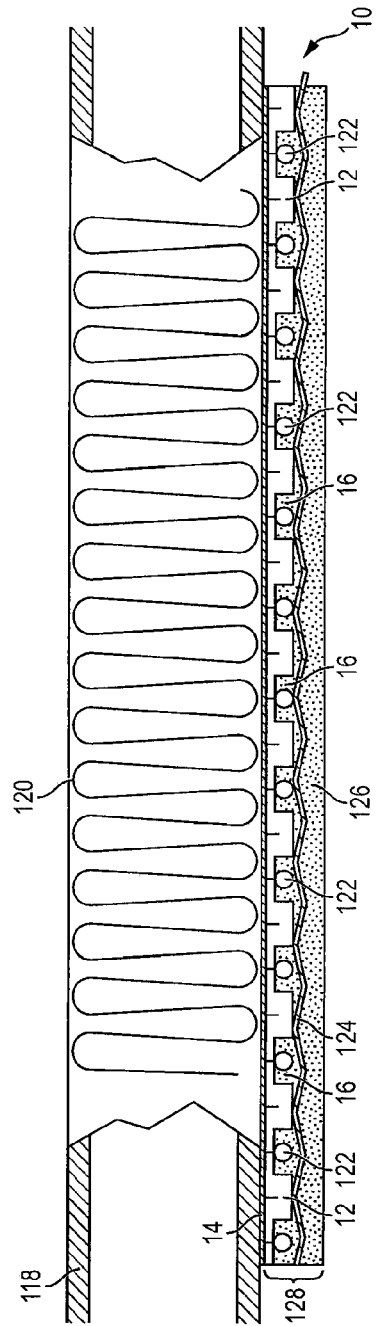
FIG. 9e
FIG. 9f

PANELS HAVING MULTIPLE CHANNEL STRUCTURES

FIELD OF THE INVENTION

This disclosure generally relates to materials and techniques used in the construction of thermal transfer systems. More particularly, this disclosure relates to panels having multiple channel structures, methods for manufacturing said panels, and thermal transfer systems or other systems that incorporate said panels, such as, for example, radiant heating systems, radiant cooling systems, and solar energy collection systems.

BACKGROUND OF THE INVENTION

As a cost of using a finite supply of fossil fuels continues to rise, increased emphasis is placed on utilizing so-called "alternative" energy sources such as, e.g., solar energy or wind energy. Likewise, increased emphasis is placed on developing more efficient and cost-effective ways of providing basic services such as heating and cooling to residential and commercial buildings.

Radiant heat transfer refers to the transfer of thermal energy by emission of electromagnetic waves from a warmed surface. Electromagnetic waves of the infrared (IR) spectrum travel through a medium such as air, striking objects and people in their path, warming the objects and/or people without directly heating the air itself. A person standing outside in direct sunlight on a winter's day is a good example of the process of radiant heating—the person may feel comfortable without a coat or jacket as long as they remain in the sunlight, but as soon as a cloud obscures the sun the person may quickly seek additional clothing.

In radiant heating systems, thermal energy can be radiated from a heated element such as a wall, floor, or overhead panel to heat people and objects adjacent to the heated elements. Conversely, in radiant cooling systems, cooled elements such as walls, floors, or overhead panels can absorb thermal energy that is radiated from warmer people and objects, making the people adjacent to the cooled elements feel more comfortable. In either case, since most of the thermal exchange occurs directly between the heated or cooled elements and people and objects in a space and not from heating or cooling the surrounding air, occupants can achieve thermal comfort when surrounding air temperatures are significantly higher (radiant cooling) or lower (radiant heating), which can result in significant savings relative to conventional forced air systems that rely primarily upon heating and cooling of the surrounding air.

In radiant systems, the heated or cooled elements can also transfer heat energy to or from objects they are in physical contact with through the mechanism of conduction. Likewise, natural convection currents can be established at an interface between the heating or cooling element and the surrounding air. Thus, even though radiant heat transfer may be the predominate method of transferring heat in a radiant system, conduction and convection may still occur in or be caused by the radiant system.

Radiant heating and cooling systems can be implemented using panels. Conventional cooling and heating panels for placement in ceilings have fixed shapes and pre-placed tubing for water passage. A disadvantage to such a conventional panel is that that, due to their fixed shape and tubing layout, it is not possible to fit the panels to the variety of shapes and obstructions that are frequently encountered in a structure, instead, the structure must accommodate the panel, leaving voids in surface coverage.

Another disadvantage to a conventional panel is that the fixed tubing pattern found in a panel cannot be optimized for different regions in the system, e.g., a residential hallway must be cooled or heated to the same extent as a residential bedroom, which is not the most efficient choice. Another disadvantage to a conventional panel is that each manufacturer purposely designs their panels to work only with their particular accessories, e.g., that manufacturer's particular style of tubing or particular method of attachment.

SUMMARY OF THE INVENTION

A need exists for a panel that facilitates installation and manufacture of thermal transfer systems, ease of wiring, and low manufacturing cost. In one embodiment, the present invention is a system including panels made from an insulating material. Each panel includes first channels and second channels disposed in a surface of the insulating material. The first channels and second channels are arranged such that each of the first channels is substantially parallel to the other first channels. Likewise, each of the second channels is substantially parallel to the other second channels, and the first channels are disposed at an angle relative to the second channels. The system further includes first retention clips disposed within the first channels of the panels, second retention clips disposed within the second channels of the panels, and a transporter disposed within the first channels and second channels of the panels. The first and second retention clips are configured to suspend the transporter within the first and second channels and to prevent the transporter from contacting walls of the first and second channels.

In another embodiment, the present invention is a panel including an insulating material, first channels disposed in a first surface of the insulating material, and second channels disposed in the first surface of the insulating material. The second channels are disposed at a first angle relative to the first channels. Additionally, the first channels and second channels are arranged such that each of the first channels is substantially parallel to the other first channels and each of the second channels is substantially parallel to the other second channels. The panel further includes a first retention clip disposed in one of the first channels. The first retention clip is configured to suspend an object having a substantially round cross-section within the one of the first channels. The first retention clip is further configured to prevent the object from contacting walls of the one of the first channels.

In another embodiment, the present invention is a panel including an insulating material, first channels disposed in a first surface of the insulating material, and second channels disposed in the first surface of the insulating material. The second channels are disposed at an angle relative to the first channels. Additionally, the first channels and the second channels are arranged such that each of the first channels is substantially parallel to the other first channels and such that each of the second channels is substantially parallel to the other second channels.

In another embodiment, the present invention is a method of fabricating a panel including providing an insulating material having first channels and second channels. The first channels are disposed in a first surface of the insulating material and the second channels are disposed in the first surface of the insulating material at an angle relative to the first channels. The first channels and second channels are arranged such that each of the first channels is substantially parallel to the other first channels and each of the second channels is substantially parallel to the other second channels.

BRIEF DESCRIPTION OF THE DRAWINGS

FIG. 1b is a cut-away diagram further illustrating a portion of the framed building structure of FIG. 1a;

FIG. 2b is a cross-sectional diagram further illustrating the first embodiment and taken along the line A-A' of FIG. 2a;

FIG. 2d is a cross-sectional diagram further illustrating the first embodiment and taken along the line B-B' of FIG. 2a;

FIG. 3b is a cross-sectional diagram further illustrating the second embodiment and taken along the line A-A' of FIG. 3a;

FIG. 3d is a cross-sectional diagram further illustrating the second embodiment and taken along the line B-B' of FIG. 3a;

FIG. 4b is a front elevation diagram further illustrating the retention clip of FIG. 4a;

FIG. 4c is a side elevation diagram further illustrating the retention clip of FIG. 4a;

FIG. 4d is a cross-sectional diagram illustrating the retention clip of FIG. 4a installed in the panel of FIG. 2a;

FIG. 5b is a front elevation diagram further illustrating the retention clip of FIG. 5a;

FIG. 5c is a side elevation diagram further illustrating the retention clip of FIG. 5a;

FIG. 5d is a cross-sectional diagram illustrating the retention clip of FIG. 5a installed in the panel of FIG. 2a;

FIG. 6 is a perspective diagram illustrating retention clips like those illustrated in FIGS. 4a-4d and 5a-5d installed in a panel like that of FIG. 3a;

FIG. 8b is a schematic diagram helping to illustrate one of the processes of FIG. 8a;

FIGS. 9a-9f are process diagrams illustrating a method of manufacturing a radiant cooling system in accordance with an example embodiment;

DETAILED DESCRIPTION OF THE DRAWINGS

Figure 1A:
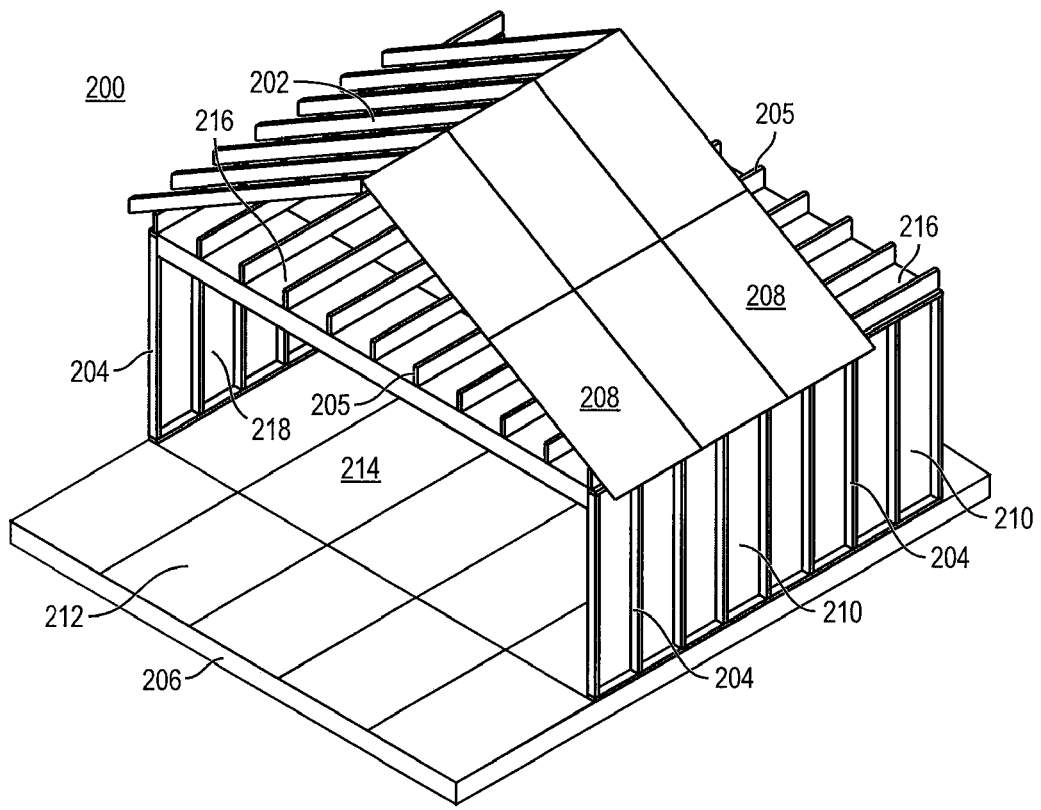
FIG. 1a is an extremely simplified perspective diagram illustrating a framed building structure, a concrete slab supporting the framed building structure, and a number of panels mounted to the framed building structure.

The present invention is described in one or more embodiments in the following description with reference to the Figures, in which like numerals represent the same or similar elements. While embodiments are described in terms of the best mode for achieving the invention's objectives, those skilled in the art will appreciate that other embodiments may cover alternatives, modifications, and equivalents as may be included within the spirit and scope of the invention as defined by the appended claims and their equivalents as supported by the following disclosure and drawings.

Unless specifically indicated, the drawings contained herein are not necessarily drawn to scale and some features may be enlarged or exaggerated in order to more easily convey aspects of the embodiments. Thus, in the absence of any particular value or range of values for a particular illustrated element, the drawings should not be relied upon for teaching the exact, quantitative dimensions of the particular element. However, the drawings do maintain the general qualitative relationship between elements correctly. That is, if a first element in a drawing is illustrated as having a greater extent in the horizontal direction than a second element in the same drawing, then the first element may be said to be wider than the second element in the horizontal direction.

For purposes of this disclosure, the term "utility" shall be defined as any service that is intended to be delivered to a room or area of a structure in order to increase the comfort or convenience of the structure. For example, utilities may include, but are not limited to, one or more services such as electrical, plumbing (water supply or sewage removal), heating, cooling, gas, and communications (e.g., telephone service, cable television or internet access).

For purposes of this disclosure, the term "transporters" shall broadly include, but is not necessarily limited to, pipes (e.g., copper pipes, plastic pipes), ducts, tubing, cables (e.g., coaxial cable, fiber-optic cable), conduit, wiring (e.g., electrical wiring, telephone or other low-voltage wiring), and their associated junctions, connections, and terminations that are used to implement a utility within the structure. The term "transporters" shall also include structural reinforcing elements such as metal reinforcing bar ("rebar") or wooden dowels; although strictly speaking, rebar and wooden dowels do not implement a utility within the structure as do the other transporters mentioned above.

For purposes of this disclosure, the term "thermal transfer system" is defined as a system that is capable of efficient heat transfer from one medium to another. Thermal transfer systems may include, but are not limited to, radiant heating systems, radiant cooling systems, and solar collection systems.

For purposes of this disclosure, the term "thermal transfer medium" is defined as any substance that is capable of transporting thermal energy using conduction. For purposes of this disclosure, the term "insulating material" is defined as any material whose thermal conduction properties are not as efficient as a thermal transfer medium that is adjacent to the insulating material.

As will be explained in greater detail below, example embodiments include panels having multiple channel structures, methods of manufacturing panels having multiple channel structures, and thermal transfer systems that include panels having multiple channel structures. As will be seen, panels according to example embodiments provide multiple channel structures that increase an ease at which radiant heating and cooling systems may be installed in new buildings or retrofitted to old buildings. As will also be seen, panels according to example embodiments are capable of increasing a thermal efficiency of framed exterior walls by providing a means for transporters to be routed through a panel rather than inside a framed wall. Routing transporters through a panel increases space that can be used for insulation within a framed wall, and also provides for easier re-wiring or repair if such becomes necessary.

As mentioned above, example embodiments are particularly well-suited for installation of radiant heating and cooling systems, where tubing that carries heated and/or cooled substances (e.g., water) is positioned within channels formed in an insulating material that constitutes the panel. However, example embodiments are not limited solely to radiant heating and cooling systems. Example embodiments may be useful for routing any type of transporter within channels formed in an insulating material of a panel. Other beneficial aspects of example embodiments will become more apparent after studying example embodiments that are described below.

FIG. 1a is an extremely simplified perspective diagram illustrating a framed building structure 200, a concrete slab 206 supporting framed building structure 200, and a number of panels 208, 210, 212, 214, 216, and 218 mounted to framed building structure 200. FIG. 1a is not a blueprint that is suitable for constructing framed building structure 200, but rather is simply intended to illustrate how panels may be mounted to a framed building structure 200 in order to implement different useful systems.

As shown in FIG. 1a, a portion of concrete slab 206 extends outwards from framed building structure 200 and is disposed at an exterior of framed building structure 200. An exterior portion of concrete slab 206 may constitute, for example, a driveway for vehicles. Framed building structure 200 further includes a number of vertically-oriented studs 204 to form walls of framed building structure 200 and a number of horizontally-oriented joists 205 to form a ceiling of framed building structure 200. Framed building structure 200 further includes rafters 202.

As shown in FIG. 1a, a number of panels 208, 210, 212, 214, 216, and 218 are mounted to framed building structure 200. Panels 208 are mounted to an exterior of rafters 202 and may be used to implement, for example, a solar energy collection system. Panels 210 are affixed to an interior wall portion of studs 204 and may be used to implement, for example, a heat dissipation system. Panels 212 are affixed to an exterior floor portion of concrete slab 206 and may be used to implement, for example, a snow and ice melting system for snow and ice that accumulate on an exterior portion of concrete slab 206. Panels 214 are affixed to an interior floor portion of concrete slab 206 and may be used to implement, for example, a radiant heating system. Panels 216 are mounted to an interior ceiling portion of joists 205 and may be used to implement, for example, a radiant cooling system. Panels 218 are mounted to an exterior wall portion of stud 204 and may be used to implement, for example, a form for a poured concrete retaining wall.

Figure 1B:
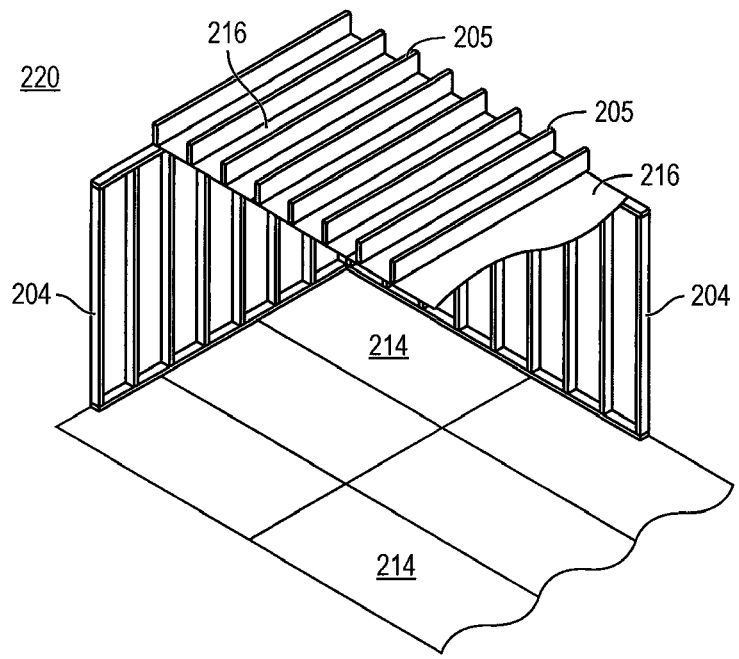

FIG. 1b is a cut-away diagram further illustrating a portion 220 of framed building structure 200 of FIG. 1a. FIG. 1b illustrates in greater detail how panels 216 may be mounted to an underside of joists 205 to implement a radiant cooling system on an interior ceiling. FIG. 1b also illustrates in greater detail how panels 214 may be mounted over concrete slab 206 (FIG. 1a) to implement a radiant heating system on an interior floor. As shown in FIGS. 1a and 1b, panels 208-218 are modular in nature. That is, panels 208-218 have a standardized shape and size and are arranged edge-to-edge in order to cover a larger area.

The use of modular panels 208-218 for the construction of the various systems mentioned above (e.g., solar collection system, heat dissipation system, snow melting system, radiant heating system, radiant cooling system, and concrete form panel) might not be new to the art. However, example embodiments, some of which are disclosed below, are believed to represent both novel and nonobvious improvements over conventional panels and systems incorporating such panels. As described in further detail below, example embodiments include panels having multiple intersecting channel structures, retention clips configured to engage sides of the channel structures to provide anchor points for transporters, systems incorporating such panels (e.g., systems including, but not limited to, the systems described above with reference to FIG. 1a), and methods of manufacturing such panels and systems.

Figure 2A:
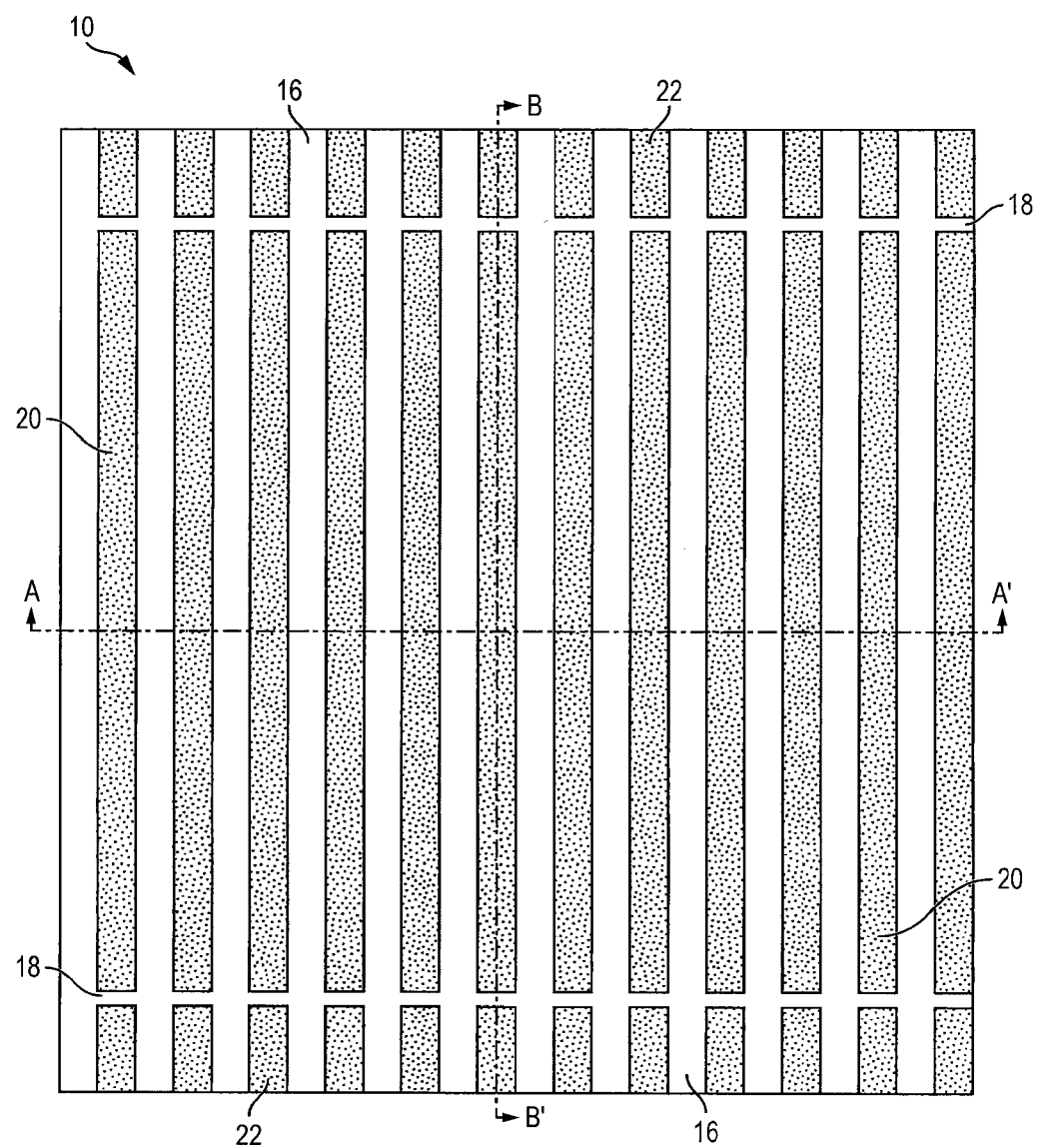
FIG. 2a is a plan diagram illustrating a panel in accordance with a first embodiment.
Figure 2B:
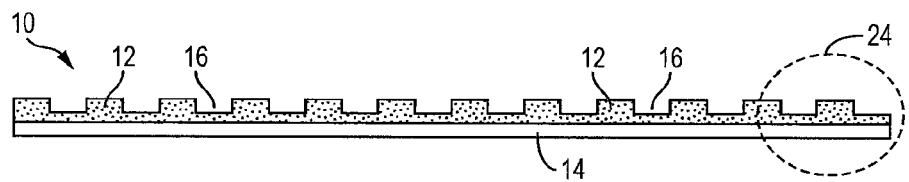
Figure 2C:
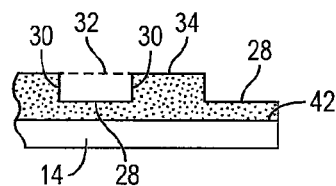
FIG. 2c is an expanded diagram illustrating in greater detail a portion of FIG. 2b.
Figure 2D:
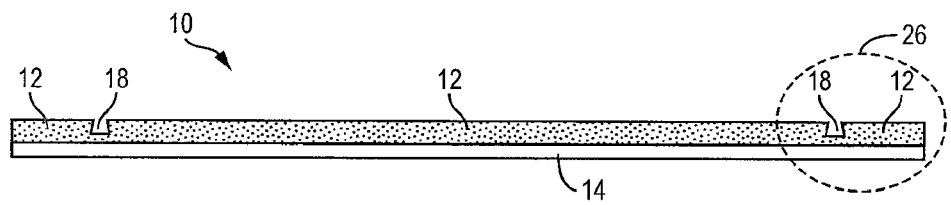
Figure 2E:
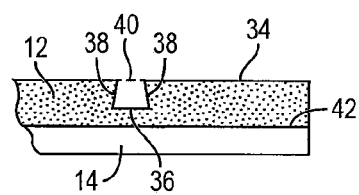
FIG. 2e is an expanded diagram illustrating in greater detail a portion of FIG. 2d.

In the following paragraphs, a panel 10 according to a first embodiment is described in detail with reference to FIGS. 2a-2e. FIG. 2a is a plan diagram illustrating panel 10. FIG. 2b is a cross-sectional diagram further illustrating panel 10 and taken along line A-A' of FIG. 2a. FIG. 2c is an expanded diagram illustrating in greater detail a portion of FIG. 2b. FIG. 2d is a cross-sectional diagram further illustrating panel 10 and taken along line B-B' of FIG. 2a. FIG. 2e is an expanded diagram illustrating in greater detail a portion of FIG. 2d.

FIG. 2a illustrates that an overall shape of panel 10 is substantially square. Generally, a rectangular or square shape for panel 10 is more convenient due to an abundance of straight lines and right angles in modern building design. However, in alternative embodiments an overall shape of a panel may be something other than rectangular or square, e.g., triangular, trapezoidal, hexagonal, or some other polygonal shape. In FIG. 2a, dimensions of panel 10 are about four feet (about 48 inches) per side, but of course other panel sizes, both larger and smaller, are contemplated.

Referring to FIGS. 2a, 2b, and 2d, panel 10 includes an insulating layer 12 disposed over an optional support substrate or backing board 14. Preferably, insulating layer 12 comprises or consists of thermofusible expanded foam such as expanded polystyrene (EPS). Other types of thermofusible expanded foams suitable for use in the insulating layer 12 include extruded polystyrene (XPS), polymethacrylimide low density rigid foam, flexible expanded polypropylene foam, polyisocyanurate foam, and polyurethane foam. Although a thermofusible expanded foam such as EPS is preferred for insulating layer 12, other example embodiments may utilize any lightweight, thermally insulating material.

As shown in FIGS. 2b-2e, insulating layer 12 has an uneven upper surface because panel 10 includes first channels 16 and second channels 18 that are disposed in the upper surface of insulating layer 12. First channels 16 are disposed parallel to each other and run lengthwise across a length of panel 10. Similarly, second channels 18 are disposed parallel to each other and run lengthwise across a width of panel 10, such that first channels 16 and second channels 18 intersect at right angles. First channels 16 and second channels 18 form pillars 20, 22 in the insulating layer 12 that extend upwardly from bottom surfaces of first and second channels 16, 18.

The right angle relationship that is illustrated between first channels 16 and second channels 18 of panel 10 is selected for ease of manufacturing reasons. However, other embodiments need not be so limited. In alternative embodiments, first channels and second channels may intersect at angles other than ninety degrees.

Similarly, while first channels 16 and second channels 18 are illustrated as parallel to opposite sides of square-shaped panel 10, other embodiments are not so limited. In other embodiments, first channels 16 and second channels 18 may be disposed in insulating layer 12 such that first channels 16 and second channels 18 form angles other than 90 degrees (e.g., 45 degrees) relative to sides of square-shaped panel 10. Again, arranging first channels 16 parallel to a first pair of opposite sides of the panel 10 and arranging second channels 18 parallel to a second pair of opposite sides of panel 10 as illustrated in FIG. 2a is preferred for system design flexibility and ease of manufacturing (cost-saving) reasons.

As shown in FIG. 2b, first channels 16 are spaced at uniform intervals across a width of panel 10. Uniform spacing between first channels 16 is chosen for system design flexibility and ease of manufacturing (cost-saving) reasons, although other embodiments may not exhibit uniform spacing between first channels. As is also shown in FIG. 2b, a width of first channels 16 is approximately the same as a distance between adjacent first channels 16. An equal relationship between a width of adjacent first channels 16 and a distance between adjacent first channels 16 is advantageous because one panel 10 may be inverted relative to a another panel 10 and offset slightly such that pillars 20, 22 of one panel 10 can be inserted into first channels 16 of another panel 10. In other words, panels 10 may be "nested," maximizing a number of panels 10 that may be placed in any given volume, and therefore saving on shipping and/or storage costs. This "nested" relationship between panels is graphically illustrated at, e.g., FIG. 8b.

On the other hand, as shown in FIG. 2d, second channels 18 are spaced apart across a length of panel 10 such that only two second channels 18 exist, one disposed proximate to a first edge of panel 10, another one disposed proximate to a second edge of panel 10, where first and second edges of panel 10 are disposed opposite to each other. Alternative embodiments can possess an odd number of second channels 18, and there may be a different number of second channels 18 disposed adjacent to one edge of a panel relative to another edge of a panel.

Figure 11:
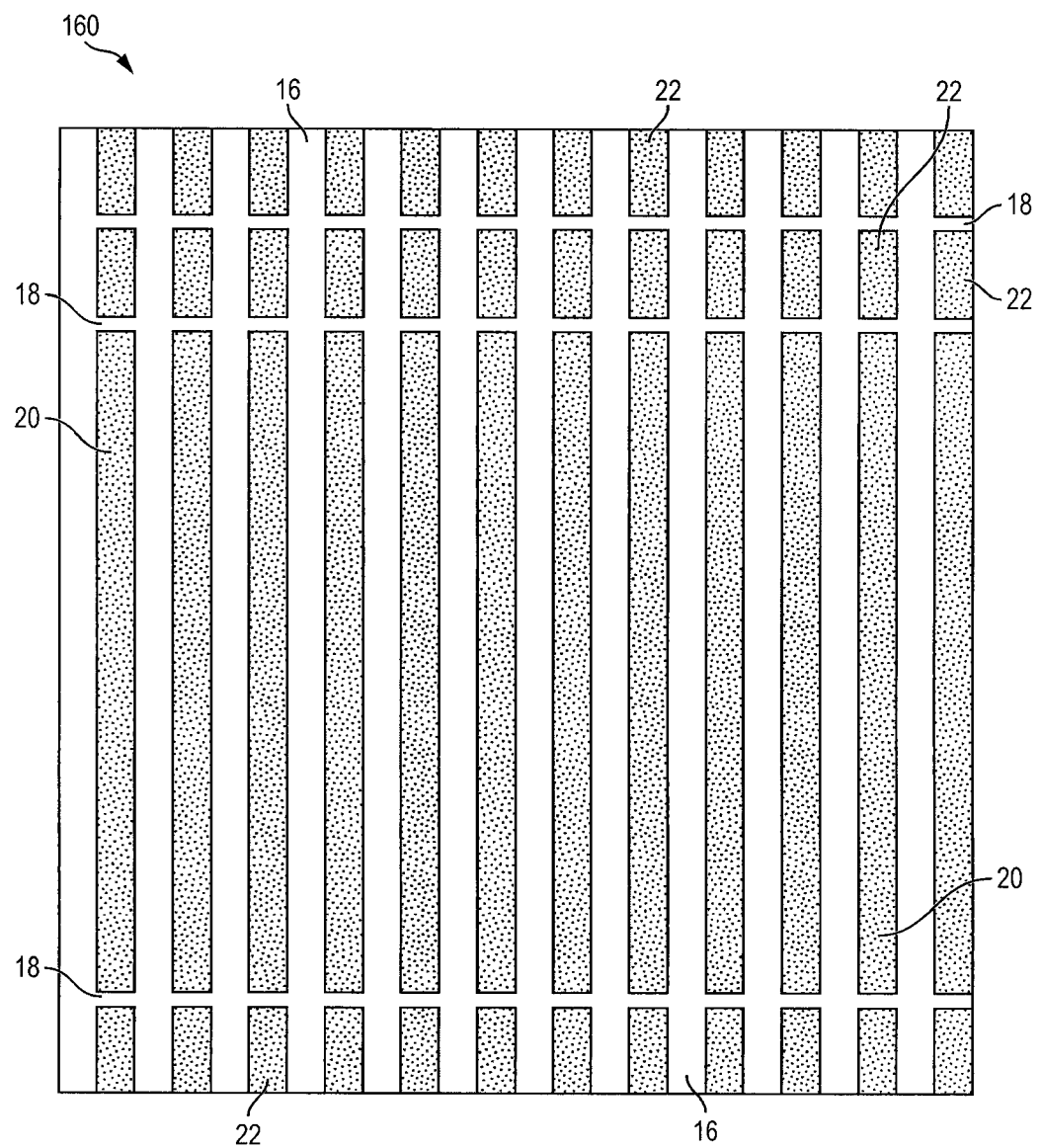
FIG. 11 is a plan diagram illustrating a panel in accordance with a third embodiment.

An example of such an alternative embodiment is illustrated in FIG. 11, which is a plan diagram illustrating a panel 160 in accordance with a third embodiment. Panel 160 includes two second channels 18 disposed proximate to a first edge of panel 10, and one second channel 18 disposed proximate to a second edge of panel 10, where first and second edges of panel 10 are disposed opposite to each other. Similar to panel 10, first channels 16 and second channels 18 intersect to form pillar structures 20 and 22.

Like panel 10, panel 160 includes a number of uniformly spaced first channels 16 disposed parallel to each other across a length of panel 160. Like panel 10, panel 160 includes a single second channel 18 disposed adjacent to a lower edge of panel 160. Unlike panel 10, panel 160 has two second channels 18 that are disposed adjacent to an upper edge of panel 160.

As illustrated in FIG. 11, a distance between an uppermost second channel 18 and an upper edge of panel 160 is substantially the same as a distance between uppermost second channel 18 and a second channel 18 that is disposed adjacent to uppermost second channel 18. A distance between a lowermost second channel 18 and a lower edge of panel 160 is substantially the same as a distance between uppermost second channel 18 and an upper edge of panel 160. Of course, a spacing between adjacent second channels 18 and a spacing between edges of panel 160 and an adjacent second channel 18 in need not be the same, and can be varied according to design choice.

Returning now to FIGS. 2b-2e, FIG. 2c illustrates in greater detail region 24 of FIG. 2b, while FIG. 2e illustrates in greater detail region 26 of FIG. 2d. FIGS. 2b-2e illustrate that first channels 16 have a substantially rectangular cross-sectional shape while second channels 18 have a substantially trapezoidal cross-sectional shape. That is, referring to FIG. 2c, a bottom surface 28 and side surfaces 30 of first channel 16, along with a line 32 that is coplanar with an uppermost surface 34 of insulating layer 12, form a substantially rectangular shape. Similarly, referring to FIG. 2e, a bottom surface 36 and side surfaces 38 of second channel 18, along with a line 40 that is coplanar with an uppermost surface 34 of the insulating layer 12, form a substantially trapezoidal shape. A trapezoidal cross-sectional shape for second channels 18 is useful for positioning and anchoring retention clips within second channels 18. Retention clips can be placed inside first channels 16 and/or second channels 18 in order to position flexible tubing or other transporters at a central location within the channels 16, 18.

In panel 10, a thickness of insulating layer 12 is about 1.0 inch. That is, a vertical distance between uppermost surface 34 and lower surface 42 of insulating layer 12 is about 1.0 inch. In panel 10, a width of first channels 16 is about 2.0 inches, and adjacent first channels 16 are about 2.0 inches apart. Thus, a distance between centers of adjacent first channels 16, or on-center spacing, is about 4.0 inches. A maximum width of second channels 18, measured across bottom surface 36 of second channels 18, is about 1.0 inch. A minimum width of second channels 18, measured across line 40 that is coplanar with uppermost surface 34, is about 0.75 inches. In panel 10, a depth of first channels 16 and second channels 18 is about 0.625 inches. That is, a vertical distance between uppermost surface 34 and bottom surfaces 28, 36 of channels 16, 18 is about 0.625 inches.

As indicated above, other panels in accordance with alternative embodiments may have first channels and second channels with cross-sectional shapes that are different than a rectangular or a trapezoidal shape disclosed for first channels 16 and second channels 18 of panel 10. Likewise, alternative embodiments may have first and second channels with cross-sectional shapes having widths and depths that are less than or greater than dimensions disclosed above for first channels 16 and second channels 18 of panel 10. As will be apparent to those of ordinary skill, a thickness of insulating layer 12 and a size of first and second channels 16, 18 may be selected based upon a size and a shape of a transporter that is intended to be disposed within first and second channels 16, 18.

Figure 3A:
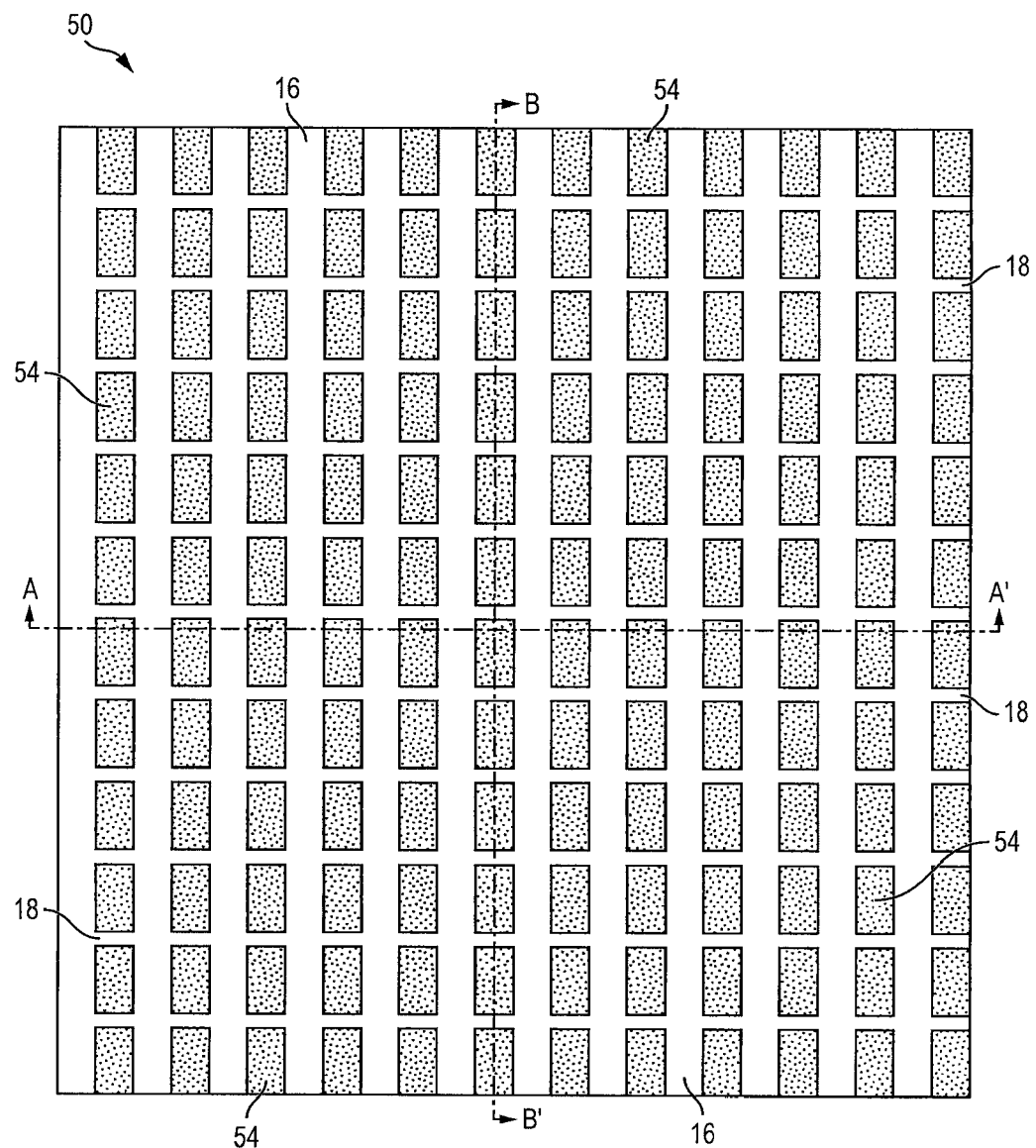
FIG. 3a is a plan diagram illustrating a panel in accordance with a second embodiment.
Figure 3B:
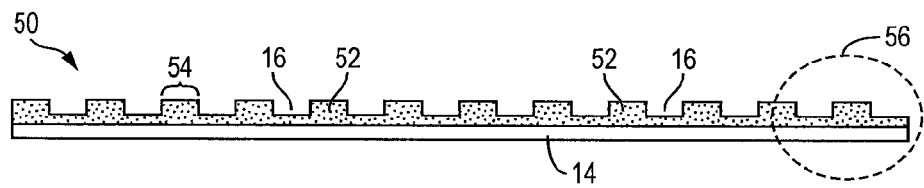
Figure 3C:
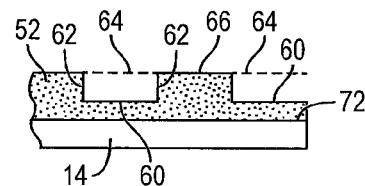
FIG. 3c is an expanded diagram illustrating in greater detail a portion of FIG. 3c.
Figure 3D:
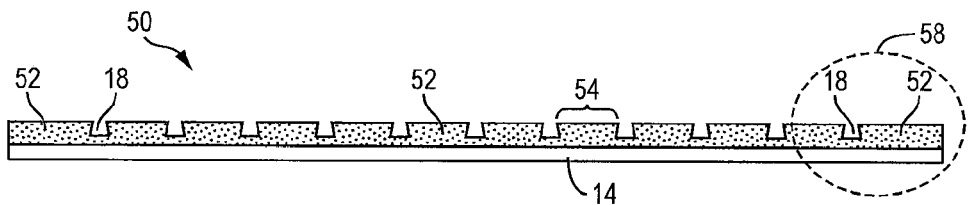
Figure 3E:
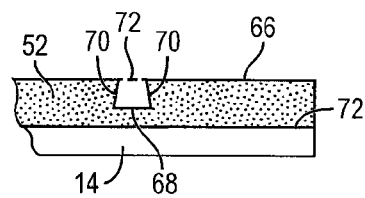
FIG. 3e is an expanded diagram illustrating in greater detail a portion of FIG. 3d.

In the following paragraphs, a panel 50 according to a second embodiment is described in detail with reference to FIGS. 3a-3e. FIG. 3a is a plan diagram illustrating a panel 50 according to a second embodiment. FIG. 3b is a cross-sectional diagram further illustrating panel 50 and taken along line A-A' of FIG. 3a. FIG. 3c is an expanded diagram illustrating in greater detail a portion of FIG. 3b. FIG. 3d is a cross-sectional diagram further illustrating panel 50 and taken along line B-B' of FIG. 3a. FIG. 3e is an expanded diagram illustrating in greater detail a portion of FIG. 3d.

FIG. 3a illustrates that an overall shape of panel 50 is substantially square. Generally, a rectangular or square shape such as the one illustrated in FIG. 3a is more convenient due to an abundance of straight lines and right angles in modern building design. However, in alternative embodiments an overall shape of the panel may be something other than rectangular or square, e.g., triangular, trapezoidal, hexagonal, or some other polygonal shape. In the illustrated embodiment, dimensions of the panel 50 are about four feet (about 48 inches) per side, but of course other panel sizes, both larger and smaller, are contemplated.

Referring to FIGS. 3a, 3b, and 3d, panel 50 includes an insulating layer 52 disposed over an optional support substrate or backing board 14. Preferably, insulating layer 52 comprises or consists of thermofusible expanded foam such as EPS. Other types of thermofusible expanded foams suitable for use in the insulating layer 52 include XPS, polymethacrylimide low density rigid foam, flexible expanded polypropylene foams, polyisocyanurate foam, and polyurethane foam. Although a thermofusible expanded foam such as EPS is preferred for insulating layer 52, other example embodiments may utilize any lightweight, thermally insulating material.

As shown in FIGS. 3a-3e, insulating layer 52 has an uneven upper surface because panel 50 includes first channels 16 and second channels 18 that are disposed in the upper surface of insulating layer 52. First channels 16 are disposed parallel to each other and run lengthwise across a length of panel 50. Similarly, second channels 18 are disposed parallel to each other and run lengthwise across a width of panel 50, such that first channels 16 and second channels 18 intersect at right angles. First channels 16 and second channels 18 form pillars 54 in the insulating layer 52 that extend upwardly from bottom surfaces of first and second channels 16, 18.

The right angle relationship illustrated between first channels 16 and second channels 18 of panel 50 is selected for ease of manufacturing. However, other embodiments need not be so limited. In alternative embodiments, first channels and second channels may intersect at angles other than ninety degrees.

Similarly, while first channels 16 and second channels 18 are illustrated as being parallel to opposite sides of square-shaped panel 50, other embodiments are not so limited. In other embodiments, first channels 16 and second channels 18 may be disposed in insulating layer 52 such that first channels 16 and second channels 18 form angles other than 90 degrees (e.g., 45 degrees) relative to sides of square-shaped panel 50. Again, arranging first channels 16 parallel to a first pair of opposite sides of the panel 50 and arranging second channels 18 parallel to a second pair of opposite sides of panel 50 as illustrated in FIG. 3a is preferred for system design flexibility and ease of manufacturing reasons.

As shown in FIG. 3b, first channels 16 are spaced at uniform intervals across a width of panel 50. Likewise, as shown in FIG. 3d, second channels 18 are spaced at uniform intervals across a length of panel 50. Uniform spacing between first channels 16 and between second channels 18 is chosen for ease of manufacturing reasons, although other embodiments contemplate that first channels and/or second channels may not exhibit uniform spacing. As is also shown in FIG. 3b, a width of first channels 16 is the same as a distance between adjacent first channels 16. An equal relationship between a width of adjacent first channels 16 and a distance between adjacent first channels 16 is advantageous because one panel 50 may be inverted relative to a another panel 50 and offset slightly such that pillars 54 of the one panel 50 can be inserted into first channels 16 of the another panel 50. In other words, panels 50 may be "nested," maximizing a number of panels 50 that may be placed in any given volume, and therefore saving on shipping and/or storage costs. This "nested" relationship between panels is graphically illustrated at, e.g., FIG. 8b.

FIG. 3c illustrates in greater detail region 56 of FIG. 3b, while FIG. 3e illustrates in greater detail region 58 of FIG. 3d. As shown in FIGS. 3b-3e, first channels 16 have a substantially rectangular cross-sectional shape while second channels 18 have a substantially trapezoidal cross-sectional shape. That is, referring to FIG. 3c, a bottom surface 60 and side surfaces 62 of first channel 16, along with a line 64 that is coplanar with an uppermost surface 66 of the insulating layer 52, form a substantially rectangular shape. Similarly, referring to FIG. 3e, a bottom surface 68 and side surfaces 70 of second channel 18, along with a line 72 that is coplanar with an uppermost surface 66 of the insulating layer 52, form a substantially trapezoidal shape. As will be made apparent in the paragraphs that follow, a trapezoidal cross-sectional shape for second channels 18 is useful for positioning and anchoring retention clips within second channels 18. As will be explained below, retention clips may be placed inside first channels 16 and/or second channels 18 in order to position flexible tubing or other transporters at a central location within the first channels 16 and/or second channels 18.

In panel 50, a thickness of insulating layer 52 is about 1.0 inch. That is, a vertical distance between uppermost surface 66 and lower surface 72 of insulating layer 52 is about 1.0 inch. In panel 50, a width of first channels 16 is about 2.0 inches, and a distance between centers of adjacent first channels 16 is about 4.0 inches. Thus, a distance between centers of adjacent first channels 16, or on-center spacing, is about 4.0 inches. A maximum width of second channels 18, measured across bottom surface 68 of second channels 18, is about 1.0 inch. A minimum width of second channels 18, measured across line 72 that is coplanar with uppermost surface 66, is about 0.75 inches. In panel 50, a depth of first channels 16 and second channels 18 is about 0.625 inches. That is, a vertical distance between uppermost surface 66 and bottom surfaces 60, 68 of first and second channels 16, 18 is about 0.625 inches.

As indicated above, other panels in accordance with alternative embodiments may have first channels and second channels with cross-sectional shapes that are different than a rectangular or a trapezoidal shape disclosed for first channels 16 and second channels 18 of panel 50. Likewise, alternative embodiments may have first and second channels with cross-sectional shapes having widths and depths that are less than or greater than dimensions disclosed above for first channels 16 and second channels 18 of panel 50. A thickness of insulating layer 52 and a size of first and second channels 16, 18 may be selected based upon a size and a shape of a transporter that is intended to be disposed within first and second channels 16, 18.

Figure 4A:
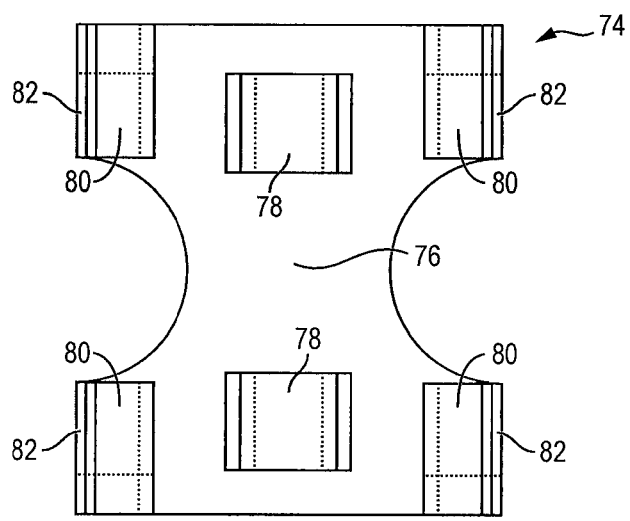
FIG. 4a is a plan diagram illustrating a retention clip in accordance with a third embodiment.
Figure 4B:
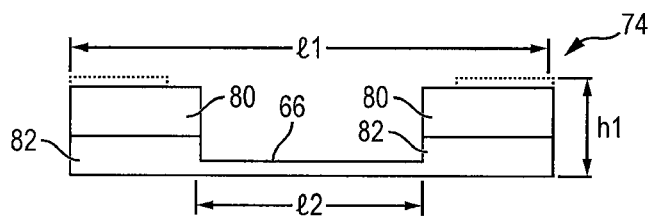
Figure 4C:
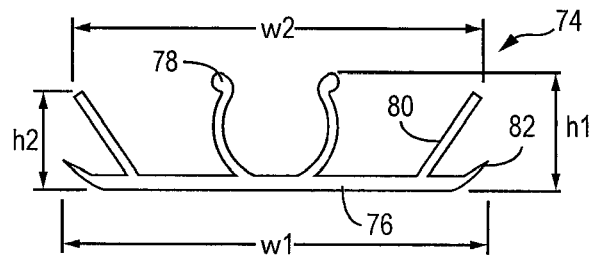
Figure 4D:
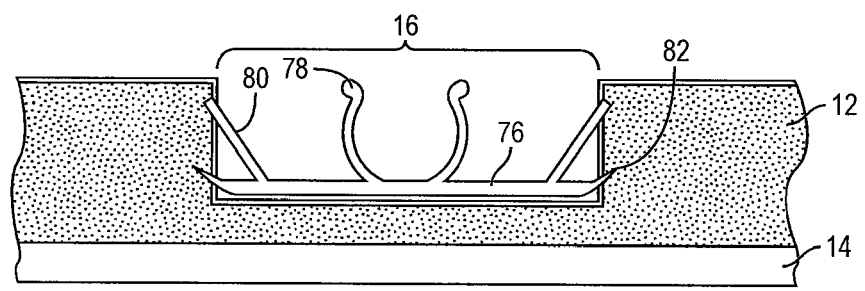

FIG. 4a is a plan diagram illustrating a retention clip 74 in accordance with a third embodiment. FIG. 4b is a front elevation diagram further illustrating retention clip 74 of FIG. 4a. FIG. 4c is a side elevation diagram further illustrating retention clip 74 of FIG. 4a. FIG. 4d is a cross-sectional diagram illustrating retention clip 74 of FIG. 4a installed in first channel 16 of panel 10 (FIG. 2a).

Referring to FIGS. 4a-4d, retention clip 74 includes a flat base portion 76, two "C"-shaped clip portions 78, angled portions 80, and spur portions 82. As shown in FIG. 4d, base portion 76 of retention clip 74 is configured to fit snugly against a bottom surface of first channel 16. Clip portions 78 are attached to base portion 76 so that a "C"-shaped opening of clip portions 78 faces upwards, away from base portion 76.

As shown, clip portions 78 are configured to retain a transporter having a substantially circular cross-section, such as, e.g., cross-linked polyethylene (PEX) tubing, coaxial cable, or electrical conduit. In alternative embodiments, a size and shape of clip portions 78 may be altered as appropriate to match a size and shape of a transporter that is to be secured by retention clip 74.

Angled portions 80 extend upwards and outwards from base portion 76, as do spur portions 82, which are disposed at edges of base portion 76. As shown in FIGS. 4c and 4d, a width w1 measured between tips of angled portions 80 and a width w2 measured between tips of spur portions 82 are somewhat greater than a width of first channel 16. Thus, as shown in FIG. 4d, angled portions 80 and spur portions 82 are configured to engage sides of first channel 16 to hold retention clip 74 in place within first channel 16.

Referring to FIGS. 2a, 3a, and 4d, multiple retention clips 74 may be inserted into first channels 16 in any desired arrangement or spacing in order to provide attachment points for transporters within first channels 16. Preferably, retention clips 74 are made of a lightweight, semi-flexible, insulating plastic material that is harder than insulating layer 12 in panel 10.

Retention clips 74 may be inserted into first channels 16 at desired intervals. To accomplish insertion of retention clips 74 into first channels 16, retention clips 74 are aligned above a desired position in first channel 16, and then pushed downwards into first channel 16 at the desired position. Since retention clips 74 are semi-flexible, ends of angled portions 80 and spur portions 82 may be bent slightly upwards when inserting retention clips into first channel 16, reducing an overall width of retention clip 74. Insulating layer 12 is relatively soft compared to the retention clips 74 as well as slightly compressible, which means that ends of angled portions 80 and spur portions 82 may push portions of insulating layer 12 aside as retainer clip 74 is pushed downwards into first channel 16. Ends of angled portions 80 and spur portions 82 are angled upwards, which facilitates pushing retention clips 74 in a downward direction into the first channels 16.

However, once retention clip 74 is positioned at a bottom surface of first channel 16, removing a pressure applied to a center of retention clip 74 in order to position retention clip 74 within first channel 16 allows semi-flexible retention clip 74 to return to its normal width. Since retention clip 74 is made of a relatively hard material compared to insulating layer 12, ends of angled portions 80 and spur portions 82 tend to penetrate or cut into insulating material 12. Furthermore, insulating material 12, which is somewhat compressible, tends to return to its original shape, thereby enclosing ends of angled portions 80 and spur portions 82. Thus, retention clip 74 is anchored within first channel 16 by angled portions 80 and spur portions 82, which prevent retention clip 74 from being pulled upwards and out of first channel 16.

In the illustrated embodiment of FIGS. 4a-4d, dimensions of retention clip 74 are as follows: length L1 is about 2.5 inches; length L2 is about 1.25 inches; width W1 is about 2.25 inches; width W2 is about 2.125 inches; height H1 is about 0.5 inches; and height H2 is about 0.375 inches. Furthermore, an outside diameter of clip portion 78 is about 0.5 inches. The above-specified dimensions for L1, L2, W1, W2, H1, and H2 are suitable for a first channel 16 having a width of about 2 inches and a depth of about 0.625 inches, and are particularly useful for implementing a radiant heating or cooling system using PEX tubing having an outside diameter of about 0.5 inches. Of course, other dimensions for retention clip 74 are contemplated.

In some alternative embodiments, retention clip 74 may additionally include one or more counter-sunk holes (not shown) that are disposed through the flat base portion 76. The presence of counter-sunk holes through the flat base portion 76 provides an additional way to secure retention clip 74 to underlying substrate materials (e.g., using a screw). Counter-sunk holes may be particularly useful in embodiments where an insulating material of the panels 10, 50 is more rigid than thermofusible foam, which may decrease a holding capability of angled portions 80 and spur portions 82. Counter-sunk holes may also be used to secure retention clip 74 (and underlying insulating material 12) to ceiling joists, floor joists, or wall studs. This allows first channels 16 to run parallel to joists or studs, which is a distinction from conventional panels where tubing is typically run in directions perpendicular to the joists or studs.

Figure 5A:
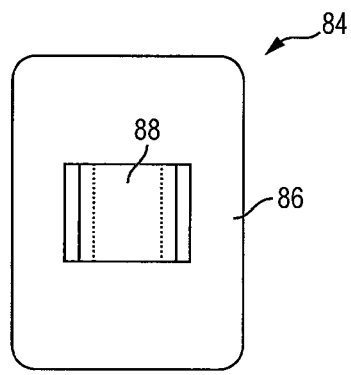
FIG. 5a is a plan diagram illustrating a retention clip in accordance with a fourth embodiment.
Figure 5B:
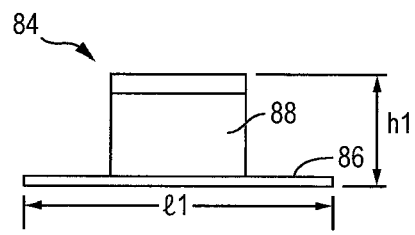
Figure 5C:
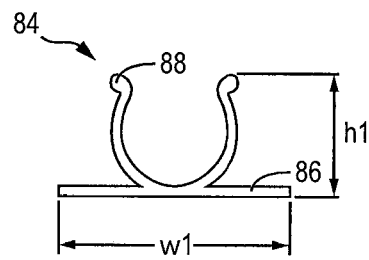
Figure 5D:
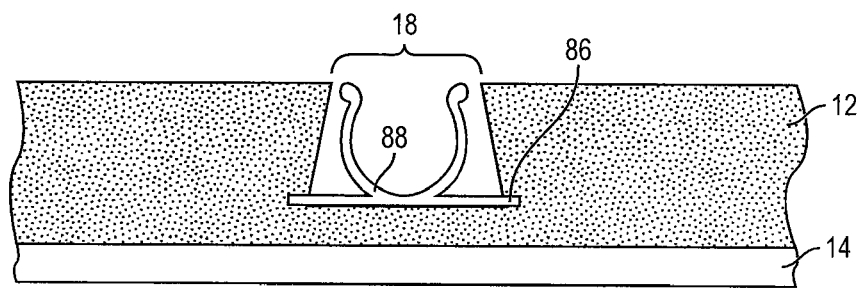

FIG. 5a is a plan diagram illustrating a retention clip 84 in accordance with a fourth embodiment. FIG. 5b is a front elevation diagram further illustrating retention clip 84 of FIG. 5a. FIG. 5c is a side elevation diagram further illustrating retention clip 84 of FIG. 5a. FIG. 5d is a cross-sectional diagram illustrating retention clip 84 of FIG. 5a installed in second channel 18 of panel 10 (FIG. 2a).

Referring to FIGS. 5a-5d, retention clip 84 includes a flat base portion 86 and a "C"-shaped clip portion 88. As shown in FIG. 5d, base portion 86 of retention clip 84 is configured to fit snugly against a bottom surface of second channel 18. Clip portion 88 is attached to base portion 86 so that a "C"-shaped opening of clip portion 88 faces upwards, away from base portion 86.

As shown, clip portion 88 is configured to retain a transporter having a substantially circular cross-section, such as, e.g., cross-linked polyethylene (PEX) tubing, coaxial cable, or electrical conduit. In alternative embodiments, a size and shape of clip portion 88 may be altered as appropriate to match a size and shape of a transporter that is to be secured by retention clip 84.

As shown in FIGS. 5c and 5d, a width w1 measured across base portion 86 is slightly greater than a width of second channel 18. Thus, edges of base portion 86 are configured to engage sides of second channel 18 to hold retention clip 84 in place within second channel 18.

Referring to FIGS. 1a, 2a, and 5d, multiple retention clips 84 may be inserted into second channels 18 in any desired arrangement or spacing in order to provide attachment points for transporters within second channels 18. Preferably, retention clips 84 are made of a lightweight, semi-flexible, insulating plastic material that is harder than insulating layer 12 in panel 10. In alternative embodiments, retention clips 84 may be made of a lightweight metal, such as aluminum.

Retention clips 84 may be positioned within a second channel 18 at desired intervals. To accomplish a positioning of retention clips 84 within a second channel 18, a retention clip 84 is first positioned to a side of a desired position in second channel 18. Generally speaking, an initial position is located where second channel 18 intersects a first channel 16, but an initial position may not always be located where second channel 18 intersects a first channel 16. Retention clip 84 is aligned with second channel 18 such that base portion 86 of retention clip 84 is parallel to and slightly above a bottom surface of second channel 18. Next, retention clip 84 is pushed in a lateral direction into second channel 18. When retention clip 84 is pushed into second channel 18 in a lateral direction, ends of relatively hard base portion 86 push aside or cut into portions of relatively soft insulating layer 12. Preferably, retention clip 84 is pushed into second channel 18 until all of retention clip 84 is disposed between adjacent pillars 20, 22 (FIG. 2a). Thus, retention clip 84 is anchored within second channel 18 by edges of base portion 86, and is prevented from being pulled upwards and out of second channel 18. A shape of second channel 18, that is, a trapezoidal shape as illustrated in FIG. 5d, also helps to prevent retention clip 84 from pulling out of second channel 18.

As illustrated in FIGS. 2a and 3a, there are a limited number of retention clips 84 that may be installed within second channels 18 of panels 10 and 50 because of a need for base portion 86 to engage pillar structures 20, 22 of FIG. 2a or pillar structures 54 of FIG. 3a. In alternative embodiments, there may be more distance between adjacent first channels 16, thereby creating space in second channels 18 sufficient to install more than one retention clip 84 between adjacent pillar structures 20, 22 (panel 10, FIG. 2a) or between adjacent pillar structures 54 (panel 50, FIG. 3a). In the case where two retention clips 84 are installed between adjacent pillar structures, it may be desirable to install retention clips 84 from opposite directions, thereby ensuring an optimal friction fit is established between base portion 86 of retention clips 84 and adjacent pillar structures.

While installing multiple retention clips 84 in areas of second channels 18 between pillars 20, 22 (FIG. 2a) and pillars 54 (FIG. 3a) may not be practical for reasons explained in the preceding paragraph, other embodiments are not so limited. For example, if a distance between adjacent first channels 16 was increased in panel 10 or panel 50, space is created for more retention clips 84 in second channels 18 between pillars 20, 22 (FIG. 2a) or pillars 54 (FIG. 3a).

In the illustrated embodiment of FIGS. 5a-5d, dimensions of retention clip 84 are as follows: a length L1 is about 1.75 inches; a width W1 is about 1.125 inches; and a height H1 is about 0.5 inches. Furthermore, an outside diameter of clip portion 88 is about 0.5 inches. The above-specified dimensions for L1, W1, and H1 are suitable for a second channel 18 having a maximum width of about 1.0 inches, a minimum width of about 0.75 inches, and a depth of about 0.625 inches, and are particularly useful for implementing a radiant heating or cooling system using PEX tubing having an outside diameter of about 0.5 inches. Of course, other dimensions for retention clip 84 are contemplated.

As described above, retention clips 74 and retention clips 84 may be installed within first channels 16 and second channels 18, respectively, of panels 10 or 50 to create anchor points for a transporter (e.g., flexible PEX tubing) at desired locations in first and second channels 16, 18. Referring to FIGS. 2a and 3a, it can be seen that the presence of intersecting first channels 16 and second channels 18 in panels 10, 50 creates a number of ways in which a transporter, (e.g., flexible tubing or electrical wire), could be routed within panels 10, 50.

Retention clips according to example embodiments, such as retention clips 74 and 84, are designed to suspend a transporter, such as flexible PEX tubing, within channels 16, 18 such that flexible PEX tubing is suspended within channels 16, 18 and prevented from touching the sides or a bottom of channels 16 and 18. It should be emphasized that while a design of retention clips 74, 84 was found to be particularly effective for this purpose, other retention clips according to alternative embodiments may look substantially different than retention clips 74 or 84. For example, instead of rectangular base portions 76, 86, base portions for other retention clips could be square, oval, or circular in shape. Similarly, retention clips according to other embodiments could utilize barbed push-in anchors or some other type of attachment. Regardless of a particular size and shape, retention clips according to example embodiments are capable of suspending a transporter within channels 16 and 18 as described above.

Figure 6:
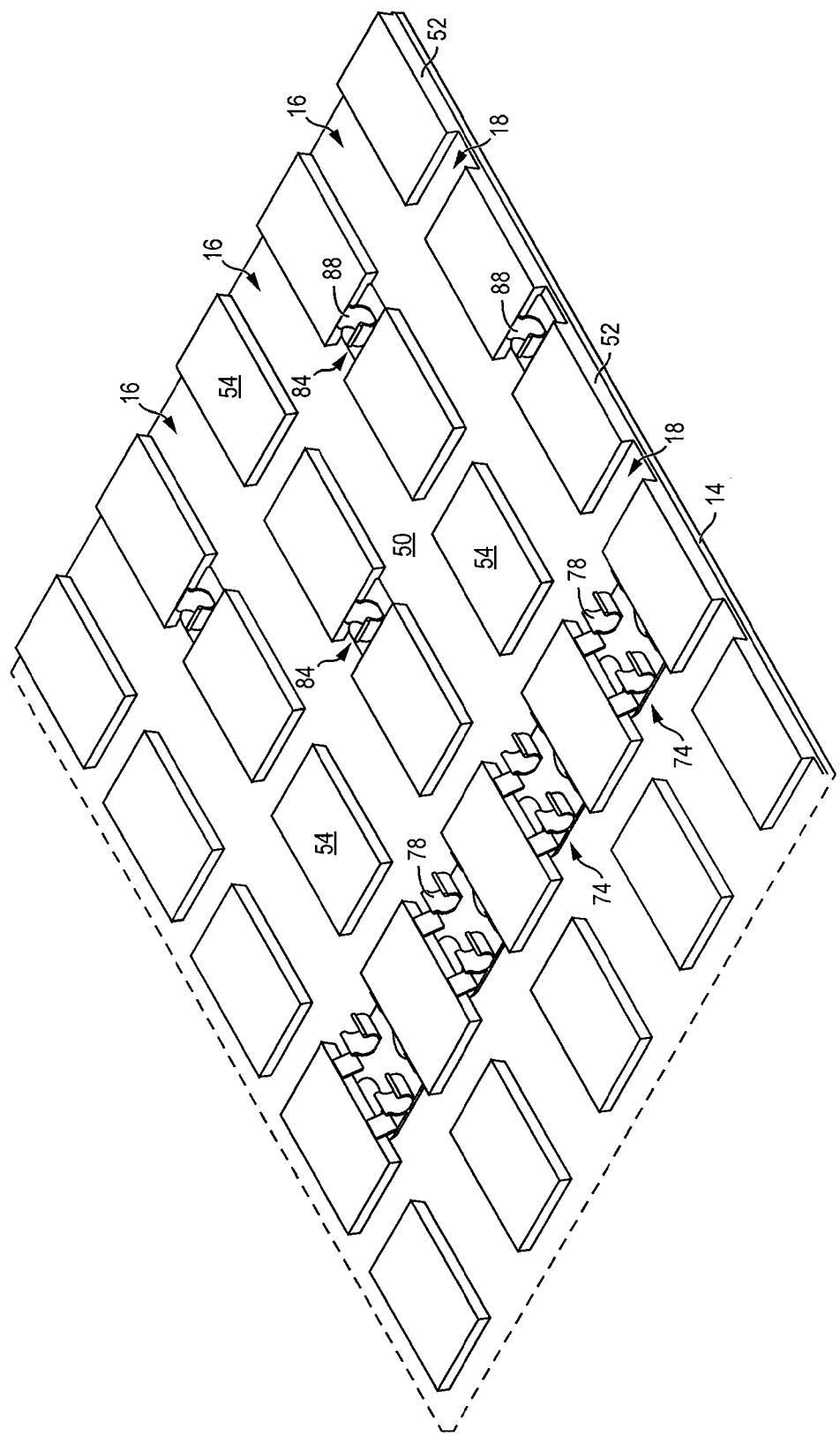

FIG. 6 is a perspective diagram illustrating a portion of a panel 50 having retention clips 74 installed within first channels 16 and retention clips 84 installed within second channels 18. As shown by FIG. 6, retention clips 74 may be installed within first channels 16 at desired locations between adjacent pillars 54. Similarly, retention clips 84 may be installed within second channels 18 at desired locations between adjacent pillars 54. Retention clips 74, 84 may be installed in panel 10 (FIG. 2a) at desired locations in a manner similar to that shown in FIG. 6.

Referring to FIGS. 4d, 5d, and 6, clip portions 78, 88 of retention clips 74, 84 are configured to position a transporter (e.g., PEX tubing) in a central location within channels 16, 18. In other words, a transporter may be effectively suspended at a central position within channels 16, 18 by retention clips 74, 84. A central position of a transporter (e.g., PEX tubing) within first and second channels 16, 18 is a useful feature when implementing radiant heating and cooling systems, as a central position maximizes an amount of surface area of PEX tubing that contacts a thermal transfer medium that will be subsequently used to fill channels 16 and 18. Example thermal transfer mediums suitable for use with example embodiments include, but are not limited to, plaster, clay, concrete, magnesium oxide cement, stucco, phase-change materials such as waxes or salts, steel pellets, sand, cob, earth, graphite, or adobe. As a surface area of PEX tubing that contacts a thermal transfer medium is increased, a radiant heating or cooling system becomes more effective in transferring heat or cold between a thermal transfer medium and PEX tubing, or alternatively, between PEX tubing and a thermal transfer medium.

It is contemplated that in other example embodiments, retention clips similar to retention clips 74 and 84 may be slightly modified to anchor multiple transporters within first channels 16 and second channels 18. That is, a width of first and second channels 16, 18 as well as a width of retention clips 74, 84 could be enlarged to accommodate two or more clip portions 78, 88 in a side-by-side configuration. Routing multiple transporters within a single first channel 16 or a single second channel 18 may be advantageous in a radiant heating or cooling system because multiple transporters can effectively increase a surface area of PEX tubing that is in contact with a thermal transfer medium.

Comparing panels 10 (FIG. 2a), 50 (FIG. 3a), and 160 (FIG. 11), panel 50 has more second channels 18 than panel 10 or panel 160. Consequently, panel 50 also has more intersections between first channels 16 and second channels 18 compared to panel 10 or panel 160. Thus, panel 50 may be more useful in routing transporters around obstacles compared to panel 10 or panel 160, although even panels 10, 160 are useful for routing transporters around obstacles because panels 10, 160 also possess a certain number of intersections between first channels 16 and second channels 18. Thus, of the three panels 10, 50, and 160, panel 10 may be more appropriate for routing transporters where there are large expanses of obstruction-free areas, while panel 50 may be more appropriate for routing transporters in areas where one or more obstructions exist, or where multiple transporters are required to converge in a central location, e.g., a single supply and return manifold with several manifold port openings for supplying and feeding multiple large areas.

A routing flexibility that is provided by panels 10, 50, or 160 is particularly useful when installing, for example, thermal transfer systems in buildings that were not originally built with such systems, although the routing flexibility provided by panels 10, 50, or 160 is useful for installing thermal transfer systems in new buildings as well. For example, a radiant cooling system may be installed on the ceiling of a room to maximize efficiency. Conversely, a radiant heating system may be installed on or in the floor of a room for the same reason. Oftentimes, there are pre-existing structures or obstructions on the floor or ceiling (e.g., free-standing kitchen counters or "islands," ceiling light fixtures) that prevent transporters from being routed through certain areas.

Figure 7:
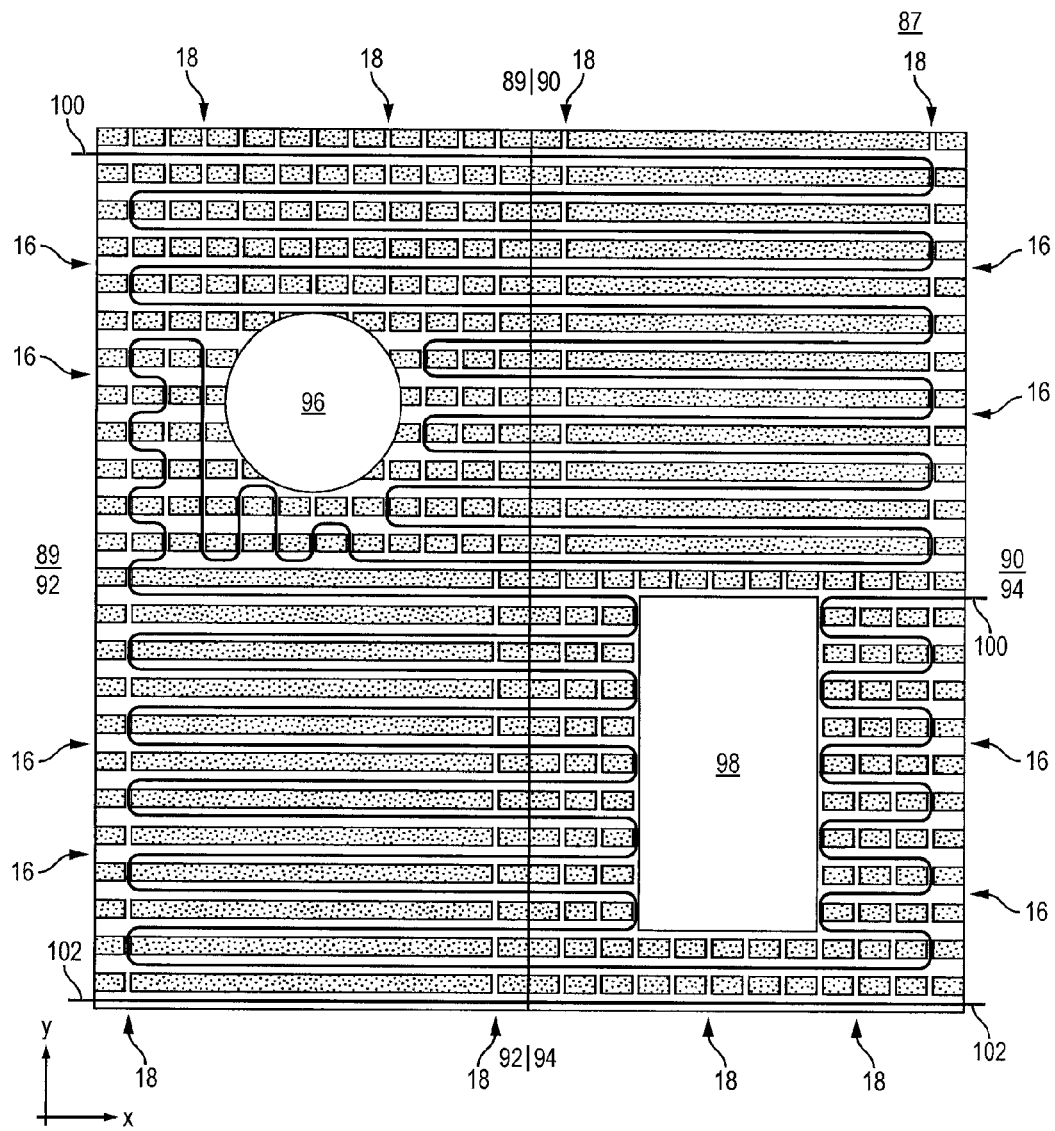
FIG. 7 is a plan diagram illustrating a thermal transfer system implemented with multiple panels like those illustrated in FIGS. 2a-2e and 3a-3e.
Figure 12:
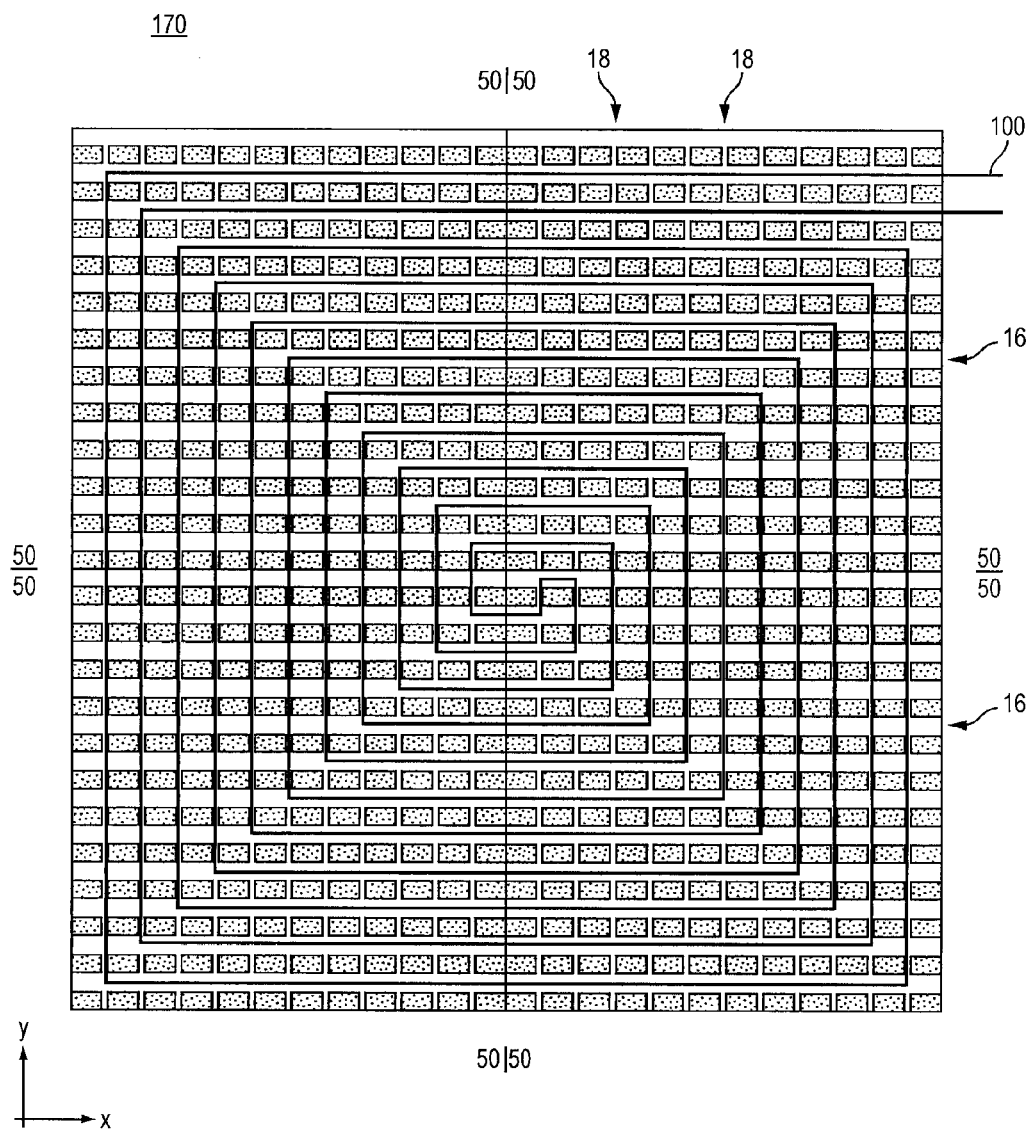
FIG. 12 is a plan diagram illustrating another thermal transfer system implemented with multiple panels like those illustrated in FIGS. 3a-3e.

With panel 10, panel 50, panel 160, or other panels in accordance with alternative embodiments, transporters may easily be routed around barriers using the directional flexibility provided by intersecting first channels 16 and second channels 18. FIG. 7 is a plan diagram illustrating some components of a thermal transfer system 87, such as a radiant cooling system, which is implemented with a combination of panels 10, 50. Likewise, FIG. 12 is a plan diagram illustrating some components of a thermal transfer system 170, such as a radiant cooling system, which is implemented with multiple panels 50. FIGS. 7 and 12 further illustrate how panels in accordance with example embodiments can provide exceptional routing flexibility and ease of fabrication for thermal transfer systems implemented with such panels.

Referring to FIG. 7, thermal transfer system 87 includes four panels 88, 90, 92, and 94. Panels 90 and 92 are identical to panel 10, which was described above with reference to FIGS. 2a-2e. Panels 89 and 94 are identical to panel 50, which was described above with reference to FIGS. 3a-3e. Panel 89 is disposed in an upper left corner of system 87, panel 90 is disposed in an upper right corner of system 87, panel 92 is disposed in a lower left corner of system 87, and panel 94 is disposed in a lower right corner of system 87.

Panels 88, 90, 92, and 94 are arranged in the illustrated manner on a ceiling (not illustrated) such that first channels 16 of panels 88, 90, 92, and 94 run lengthwise in an x-direction and second channels 18 of panels 88, 90, 92, and 94 run lengthwise in a y-direction, where x and y directions are perpendicular to each other.

Panels 88, 90, 92, 94 are arranged such that first channels 16 of panel 89 are continuous with first channels 16 of adjacent panel 90. Likewise, first channels 16 of panel 92 are continuous with first channels 16 of panel 94. Thus, first channels 16 from each panel 88, 90, 92, 94 combine with first channels 16 from an adjacent panel to form multiple continuous channels that extend across system 87 in the x-direction.

Similarly, panels are arranged such that second channels 18 of panels 90 and 92 are continuous with outermost second channels 18 of adjacent panels 88, 94. Thus, each of the second channels 18 in panels 90, 92 combines with a second channel 18 from an adjacent panel to form multiple continuous channels that extend across system 87 in the y-direction.

Panel 89 includes a circular region 96, while panel 94 includes a rectangular region 98. Regions 96 and 98 are representative of obstructions that prevent transporters from being positioned in particular areas of panels 89 and 94. Region 96 may represent, for example, a circular light fixture installed in the ceiling. Region 98 may represent, for example, a rectangular skylight installed in the ceiling. Prior to system 87 being assembled from panels 88, 90, 92, 94 as described above, regions of panels 89 and 94 that correspond to regions 96 and 98 may be cut from the panels to accommodate the obstruction.

System 87 further includes flexible PEX tubing, represented by line 100, disposed in first channels 16 and second channels 18. System 87 further includes retention clips 74 (FIGS. 4a-4d) disposed in first channels 16 and retention clips 84 (FIGS. 5a-5d) disposed in second channels 18 at desired locations to provide anchor points for flexible PEX tubing 100. However, to avoid unnecessarily obscuring aspects of FIG. 7 with too much detail, retention clips 74 and 84 are not illustrated in FIG. 7.

As shown in FIG. 7, intersecting first channels 16 and second channels 18 provide multiple paths for routing flexible PEX tubing 100 around regions 96 and 98, and to evenly distribute flexible PEX tubing 100 in unobstructed regions of system 87. It was explained above how an OC spacing between first channels 16 in panels 88, 90, 92, 94 is about 4.0 inches. Thus, PEX tubing 100 in system 87 is also spaced about 4.0 inches apart. An even distribution of PEX tubing 100 in unobstructed regions of system 87 may be desirable for both radiant cooling systems and radiant heating systems.

In some applications, however, it may be desirable to use different spacing for PEX tubing 100 within a system or even within a single panel. For example, it may be desired to maximize output of a radiant heating system along exterior walls, and minimize output of a radiant heating system in interior regions away from exterior walls. As another example, it may be desired to maximize output of a radiant heating system in a bedroom of a residential dwelling, and minimize output of a radiant heating system in an interior hallway adjacent to a bedroom.

Panels according to example embodiments, such as panels 10 and 50, allow a thermal transfer system using such panels to easily achieve different levels of output in different regions. Second channels 18 allow a system designer or builder to use variable spacing between PEX tubing 100 within first channels 16 of a system or even a single panel. Because individual first channels 16 of panels 10, 50 have an OC spacing of about 4.0 inches, PEX tubing 100 may be spaced at any desired multiple of 4.0 inches.

For example, for a residential bedroom or for a region alongside an exterior wall, an OC spacing of 4.0 inches may be used for PEX tubing 100. For a residential hallway or for an interior region away from an exterior wall, an OC spacing of 8.0 inches, 12.0 inches, or even 16.0 inches or more could be used. It should be evident from the disclosure contained herein that any desired layout for PEX tubing 100 can be easily achieved by placement of retention clips 74, 84 in desired locations of first channels 16 and second channels 18, and variable OC spacing can be achieved across a single panel to obtain a desired energy transfer from one area of a panel to another area of the same panel. In other words, the system is design capacity configurable within a single panel 10, 50.

Thus, as explained above, panels according to example embodiments allow for variable OC spacing of PEX tubing 100 or another transporter within a single panel. Variable OC spacing for a transporter contained within a single panel 10 or 50 as provided by example embodiments is a system design capacity feature that is believed to be unique to example embodiments.

Referring now to FIG. 12, thermal transfer system 170 includes four panels 50, placed together as illustrated to cover a larger square-shaped area. Panels 50 are arranged in the illustrated manner on a ceiling (not illustrated) such that first channels 16 of panels 50 run lengthwise in an x-direction and second channels 18 of panels 50 run lengthwise in a y-direction, where x and y directions are perpendicular to each other.

Panels 50 are arranged such that first channels 16 are continuous in the x-direction. Thus, first channels 16 from panels 50 on a left side of system 170 combine with first channels 16 from panels 50 on a right side of system 170 to form multiple continuous channels that extend across system 170 in the x-direction.

Similarly, panels 50 are arranged such that second channels 18 are continuous in the y-direction. Thus, second channels 18 from panels 50 on an upper side of system 170 combine with second channels 18 on a lower side of system 170 to form multiple continuous channels that extend across system 170 in the y-direction.

System 170 further includes flexible PEX tubing, represented by line 100, disposed in first channels 16 and second channels 18 in the arrangement shown. System 170 further includes retention clips 74 (FIGS. 4a-4d) disposed in first channels 16 and retention clips 84 (FIGS. 5a-5d) disposed in second channels 18 at desired locations to provide anchor points for flexible PEX tubing 100. However, to avoid unnecessarily obscuring aspects of FIG. 12 with too much detail, retention clips 74 and 84 are not illustrated in FIG. 12.

As shown in FIG. 12, intersecting first channels 16 and second channels 18 provide multiple paths for routing flexible PEX tubing 100 and to evenly distribute flexible PEX tubing 100 in unobstructed regions of system 170. It was explained above how an OC spacing between first channels 16 in panels 50 is about 4.0 inches. Thus, PEX tubing 100 in system 170 is also spaced about 4.0 inches apart. An even distribution of PEX tubing 100 in unobstructed regions of system 170 may be desirable for both radiant cooling systems and radiant heating systems.

As shown in FIG. 12, flexible PEX tubing 100 of system 170 is arranged such that ends of PEX tubing 100 are disposed adjacent to each other. Disposing ends of flexible tubing 100 adjacent to each other is often desirable because ends of PEX tubing 100 are typically connected to supply and return manifolds, which are most often disposed close to one another in building structures.

In FIG. 12, flexible PEX tubing 100 is also arranged such that a flow direction of a liquid travelling in PEX tubing 100 spirals inward towards a center region of system 170, then spirals outward towards a perimeter region of system 170. As shown in FIG. 12, flexible PEX tubing 100 takes on the overall shape of two interlocking square spirals, with one square spiral joining the other square spiral in a center of system 170. In alternative systems having an overall rectangular shape, rectangular spirals may be used.

An interlocking spiral configuration for PEX tubing 100 is desirable because it alternately places fluid that is flowing inward (supply) adjacent to fluid that is flowing outward (return). Thus, any temperature differential between supply fluid and return fluid in flexible PEX tubing 100 is evened out across system 170, instead of creating relatively "hot" or "cold" spots in different regions of system 170.

Figure 8A:
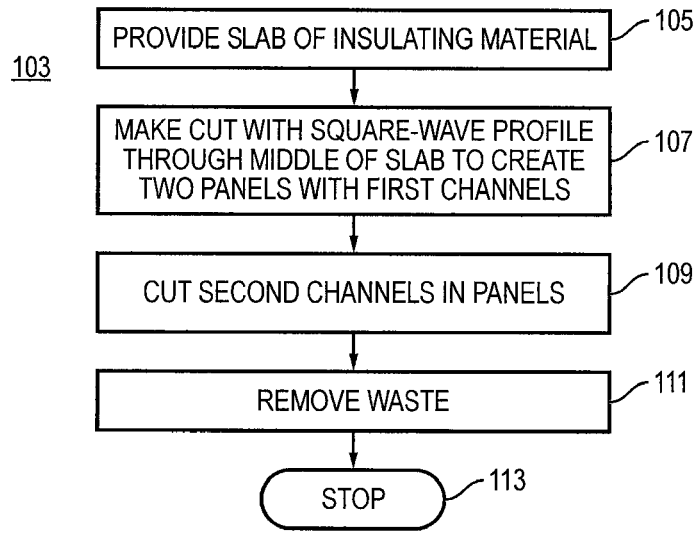
FIG. 8a is a process flow diagram illustrating some processes included in a method of fabricating the panel of FIGS. 2a-2e or 3a-3e in accordance with an example embodiment.
Figure 8B:
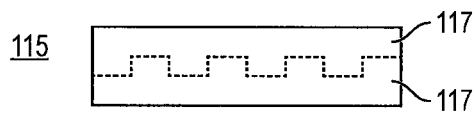
Figure 8C:
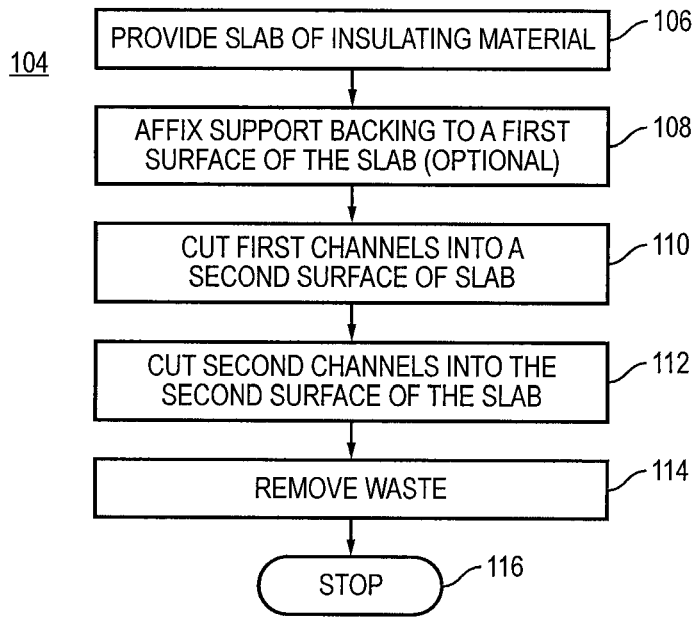
FIG. 8c is a process flow diagram illustrating some processes included in a method of fabricating the panel of FIGS. 2a-2e or 3a-3e in accordance with another example embodiment.

FIG. 8a is a process flow diagram illustrating some processes included in a method 103 for fabricating a panel, such as panel 10 of FIGS. 2a-2e or panel 50 of FIGS. 3a-3e, in accordance with an example embodiment. FIG. 8b is a schematic diagram further illustrating one of the processes included in method 103. FIG. 8c is a process flow diagram illustrating some processes included in a method 104 for fabricating panels, such as panels 10 of FIGS. 2a-2e, or panels 50 of FIGS. 3a-3e, in accordance with another example embodiment. Other example embodiments may include more or fewer processes than those illustrated by FIG. 8a or 8c. Other example embodiments may include processes identical to those illustrated in FIG. 8a or 8c, although performed in a different sequential order.

Referring now to FIG. 8a, a method 103 of fabricating panels includes a process 105 of providing a slab of insulating material. According to process 105, an insulating slab comprises or consists of a thermofusible expanded foam, such as EPS. In this embodiment, a length and a width of a provided insulating slab has the same length and width as a finished panel, although this may not hold true for all embodiments. For example, if a finished panel has a desired overall length and width of four feet long (4') by four feet wide (4'), a length and width of a provided insulating slab will also be 4' by 4'. As will be seen below, according to this embodiment a thickness of a provided insulating slab is not the same as a thickness of a finished panel.

Next, method 103 includes process 107, which involves making a single continuous cut across a thickness of a provided insulating slab to simultaneously separate the provided slab into two separate panels and to form first channels shaped like first channels 16 found in panel 10 or panel 50. Process 107 is illustrated in further detail in FIG. 8b, which shows a slab 115 of insulating material with a dotted line that indicates a path of a cut that may be used to separate slab 115 into two separate panels 117. As shown in FIG. 8b, a single cut can separate insulating slab 115 into two identical panels 117, each panel 117 having first channels that are defined by a path of a single cut.

As illustrated in FIG. 8b, a path of a cut is preferably arranged such that two panels having an identical shape are formed. However, alternative embodiments may implement cuts that do not produce identical panels. An advantage to using a single cut to simultaneously form first channels in two separate panels 117 as illustrated in FIG. 8b is that no additional material is wasted besides material that is destroyed by passage of the cutting instrument, thereby saving on manufacturing costs. Another advantage to process 107 is that panels 117 may be nested together as shown in FIG. 8b, which reduces an amount of space required to store or ship completed panels.

Next, in process 109, separated panels 117 are cut to form second channels that are shaped like channel 18 found in panel 10 or panel 50. For processes 107 and 19, first and second channels are preferably cut using a hot wire foam cutter (HWFC). HWFCs use a heated, tensioned, metal wire to cut thermofusible expanded foams, such as EPS. As a heated wire passes through material to be cut, heat from the wire vaporizes the material just in advance of the contact. HWFCs may be computer controlled and are capable of making very precise cuts. One HWFC suitable for cutting insulating material in accordance with example embodiments is Model No. FCX1248 (Automatic 4-axis Foam Cutter), manufactured by FoamLinx Technologies, 1248 Birchwood Drive, Sunnyvale, Calif. 94089. Because a HWFC is capable of making cuts that follow paths having abrupt changes of direction, a HWFC is preferably used for process 107. For process 109, however, second channels may be cut from surfaces of panels using a HWFC, a saw, or a router.

Next, waste material that is produced from cutting process 109 (if any) is removed in process 111, and method 103 stops at process 113, thereby completing method 103. At completion of method 103, two panels are produced from a single slab of insulating material. Method 103 may be repeated any number of times to manufacture any desired number of panels (if an odd number of panels is desired one additional panel will necessarily be produced). Using method 103 that was described above, panels such as panel 10 (FIGS. 2a-2e), panel 50 (FIGS. 3a-3e), and other panels having first and second channels of varying shapes and sizes may be manufactured.

Now referring to FIG. 8c, a method 104 of fabricating panels includes a process 106 of providing a slab of insulating material. According to some example embodiments, an insulating slab may comprise or consist of thermofusible expanded foam. Preferably, a size and a shape of an insulating slab are the same size and shape as a finished panel. For example, if a finished panel has a desired overall size of four feet long (4') by four feet wide (4'), a size of a provided insulating slab will also be 4' by 4'.

Next, method 104 includes an optional process 108, which is a process of affixing a layer of backing board to a first surface of the insulating slab, in which the first surface is preferably perpendicular to a thickness of the insulating slab. Affixing a layer of backing board to the insulating slab is advantageous because backing board layer can provide additional support to an insulating slab during subsequent processing steps. Backing board is also advantageous in a finished panel for the same reason, i.e., providing additional strength to a finished panel.

A thickness of a backing board layer that is affixed to a first surface of an insulating slab is less than a thickness of an insulating slab, although other embodiments are not so limited. Similarly, a length and a width of a backing board layer that is affixed to a first surface of an insulating slab may be the same as a length and a width of an insulating slab, although other embodiments are not so limited. Furthermore, for those embodiments that do not include a process 108 of affixing a backing board layer to an insulating slab, a thickness of the provided insulating slab may be the same as a thickness of a completed panel. That is, if a thickness of an insulating slab is one inch (1"), a maximum thickness of a completed panel may also be 1".

Method 104 further includes a process 110, which is a process of cutting first channels into a second surface of an insulating slab, where a second surface of an insulating slab is opposite a first surface. Like a first surface of the insulating slab, a second surface is also perpendicular to a thickness of an insulating slab. After process 110, method 104 further includes process 112, where second channels are cut into a second surface of an insulating slab. First and second channels may be shaped like, e.g., first channels 16 and second channels 18 of panels 10 and 50 (FIGS. 2a-2e and 3a-3e).

Preferably, first and second channels are cut from the insulating slab using a hot wire foam cutter (HWFC). Alternatively, processes according to other example embodiments may cut first and second channels into an insulating slab using other tools such as, e.g., a saw or router.

Next, waste material produced from cutting processes 110, 112 are removed in process 114, and method 104 stops at process 116, thereby completing method 104. At completion of method 104, a single panel has been produced, and method 104 may be repeated any number of times to manufacture any desired number of panels. Using method 104 described above, panels such as panel 10 (FIGS. 2a-2e), panel 50 (FIGS. 3a-3e), and other panels having first and second channels of varying shapes and sizes may be manufactured.

In other alternative embodiments, panels such as panel 10 or panel 50 may be manufactured by injecting polystyrene beads into pre-formed molds under heat and pressure, a process known as foam injection molding. Molds may subsequently be removed after the polystyrene beads have solidified, leaving behind a completed panel. Initially, a cost of making molds for a foam injection molding process is a relatively large expense. However, an advantage to manufacturing panels using foam injection molding is that once molds are completed, panels may be manufactured relatively cheaply.

Other advantages to using foam injection molding include the ability to pre-position retention clips, such as retention clips 74 or 84, within a mold before injecting foam. Upon solidification, a completed panel with pre-positioned retention clips is achieved. Depending on a particular mold design, other embodiments could produce mirrored sets of panels. In still other embodiments, a foam injection mold could be designed such that foam itself is shaped into retention clips that are capable of suspending transporters within first and second channels of completed panels.

FIGS. 9a-9f are cross-sectional process diagrams illustrating a method of manufacturing a radiant cooling system in accordance with an example embodiment. While FIGS. 9a-9f illustrate only one panel, it will be appreciated that typical radiant cooling systems, radiant heating systems, or other systems such as those described above with reference to FIG. 1a usually utilize multiple panels, similar to a situation described above with reference to FIG. 7. Referring to FIGS. 9a and 9b, a panel 10 with insulating layer 12, backing board 14, and first channels 16 as described above with reference to FIGS. 2a-2e is affixed to an underside of a ceiling 118, such that backing board 14 is towards ceiling 118. Panel 10 may be affixed to ceiling 118 with nails, screws, staples, or other fastening means. Ceiling 118 includes insulation material 120.

Prior to securing panel 10 to ceiling 118, retention clips (e.g., retention clips 74 (FIGS. 4a-4d) and retention clips 84 (FIGS. 5a-5d)), may be installed at desired locations within first channels 16 and second channels 18, respectively. To avoid adding unnecessary clutter to FIGS. 9a-9f, retention clips 74 and 84 are not shown within first channels 16 of panel 10. Installation of retention clips 74 and 84 may be accomplished in a manner similar to that described above with reference to FIGS. 4a-4d, 5a-5d, and 6, while panel 10 is conveniently located on another, more accessible surface, such as a work bench or even the floor.

In alternative embodiments, such as those where a radiant heating system is to be installed on a floor, or where a radiant heating or cooling system is to be installed on a wall, panels (such as panel 10) may be affixed to a desired surface (such as a floor or wall) before installing retention clips within first and second channels. In short, according to example embodiments, retention clips may be installed within a panel either before or after a panel is affixed to a desired surface of a structure, depending upon what is more convenient.

Process steps that are illustrated by FIGS. 9a and 9b may be repeated multiple times by a single worker installing an entire system or simultaneously by many workers installing an entire system. By repeatedly performing process steps illustrated by FIGS. 9a and 9b, any desired portion of an underside of ceiling 118, including an entirety of an underside of ceiling 118, may be covered with multiple panels 10.

Referring now to FIGS. 9c and 9d, PEX tubing 122 is inserted into first channels 16 and second channels 18 (not shown) of panel 10 and held in place using pre-installed retention clips 74, 84 (not shown) as described above. Next, an expanded metal lath 124 is secured to an underside of panel 10, covering first channels 16, second channels 18 (not shown) and PEX tubing 122.

Expanded metal lath 124 may be made of galvanized or stainless steel and has a mesh-like structure that is not visible in the cross-sectional diagrams of FIGS. 9c and 9d. As explained in further detail below, expanded metal lath 124 provides an excellent key for a thermal transfer medium such as plaster or stucco.

Expanded metal lath 124 may be secured to an underside of panel 10 using nails, screws, staples, or other fasteners. According to some embodiments, expanded metal lath 124 may be secured to an underside of panel 10 using the same nails, screws, staples, or other fasteners that secure panel 10 to an underside of ceiling 118.

Referring to FIGS. 9e and 9f, a thermal transfer medium 126 is then applied over insulating layer 12 and expanded metal lath 124. Thermal transfer medium 126 may be, for example, a plaster finish or a stucco finish.

It will be appreciated that a thermal transfer medium 126 such as stucco, plaster, clay, or concrete is typically not applied in any particular solid form as shown in FIG. 9e, but rather as a viscous substance that is capable of being pushed through holes in expanded metal lath 124 to fill remaining spaces found in first channels 16 and second channels 18, to completely cover PEX tubing 122, and to cover expanded metal lath 124. Expanded metal lath 124 is often referred to as a "key" for thermal transfer medium 126, as its inherent structural rigidity may prevent or reduce cracking of thermal transfer medium 126.

Although expanded metal lath 124 may be a standard stucco or plaster lath, a relatively small size of an opening that is found in stucco or plaster lath may make it difficult to completely cover PEX tubing 122 in thermal transfer medium 126 after a stucco or plaster lath is installed. Therefore, expanded metal lath 124 may have larger openings than a standard plaster or stucco lath. Alternately, expanded metal lath 124 could instead be installed after thermal transfer medium 126 was first applied to encase PEX tubing 122 in first and second channels 16, 18.

In some embodiments, metal lath 124 may be replaced with a lath or grid that is made from alternative manufactured or natural materials such as, e.g., plastic, bamboo, carbon fibers, graphite, and fiberglass, which are lightweight, strong, and can also prevent or reduce cracking of a thermal transfer medium. Laths or grids made of alternative materials such as plastic or bamboo may be especially useful in situations where the additional heat conduction properties of a metal lath is not required or in environments where metal lath would not be particularly well-suited, for example, exterior applications in a corrosive marine environment.

As was indicated above, retention clips 74, 84 can be adapted to suspend PEX tubing 122 in first and second channels 16, 18 such that it does not touch sides or a bottom of first and second channels 16, 18. Because PEX tubing 122 is suspended in channels 16, 18, it may be completely embedded within thermal transfer medium 126.

Thermal transfer medium 126 may be shaped during application to form a relatively smooth surface, as shown in FIG. 9f. Alternatively, thermal transfer medium 126 may be worked with different masonry tools while still wet to achieve textured surfaces. Many existing methods of applying a thermal transfer medium 126 (such as, e.g., plaster, stucco, clay, or concrete) are suitable for use with example embodiments and a description of such methods is not necessary for an understanding of example embodiments.

Thus, FIG. 9f illustrates a portion 128 of a completed radiant cooling system that is installed on an underside of a ceiling 118. As described above, such a radiant cooling system includes one or more panels such as panel 10 or panel 50, retention clips such as retention clips 74 or 84, PEX tubing 122, expanded metal lath 124, and thermal transfer medium 126.

Figure 10A:
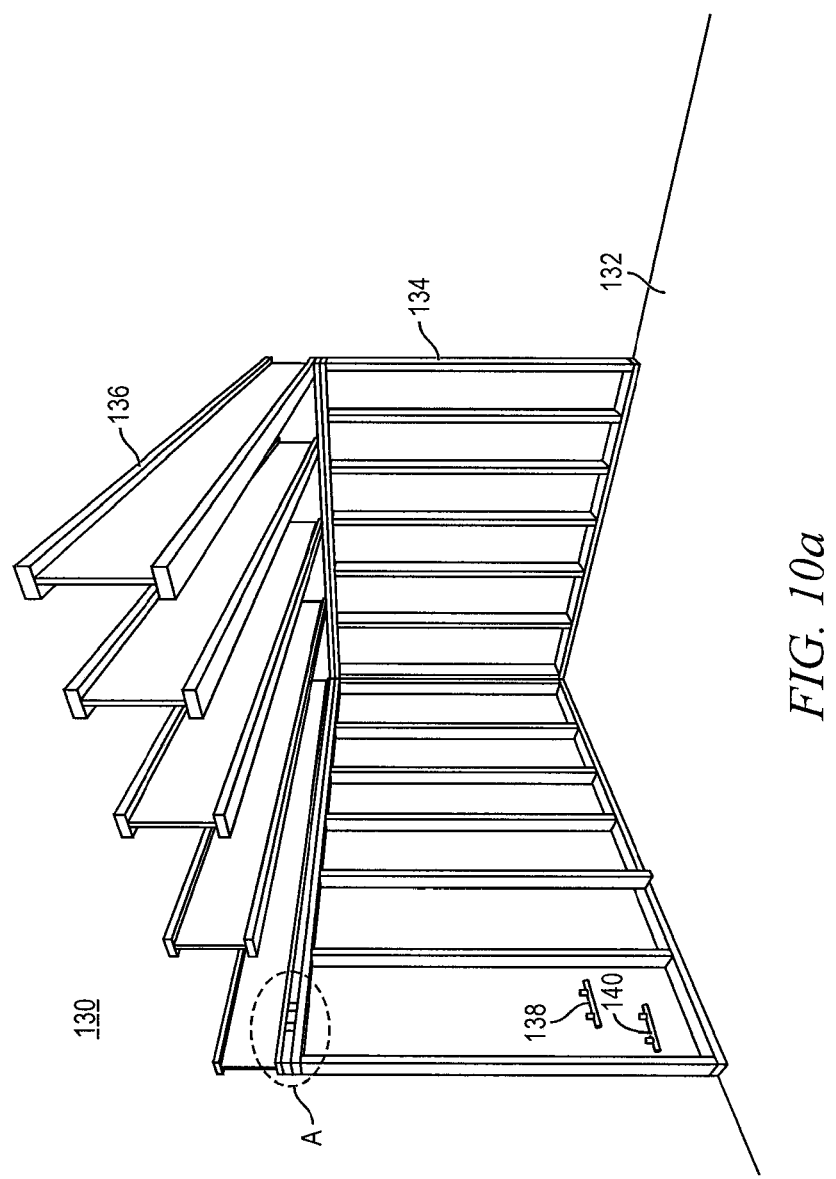
FIGS. 10a-10i are process diagrams illustrating a method of manufacturing a radiant cooling system in accordance with another example embodiment.

FIGS. 10a-10i are process diagrams illustrating a method of manufacturing a radiant cooling system in accordance with another example embodiment. FIG. 10a is a perspective diagram that is representative of a typical installation location for a radiant cooling system. As shown in FIG. 10a, a corner portion 130 of a framed building structure includes a concrete slab floor 132, a number of studs 134, and a number of joists 136 that are supported by studs 134. Corner portion 130 also includes a water supply manifold 138 and a water return manifold 140. As will be described in greater detail below, two panels like those described above with reference to FIGS. 2a-2e and two panels like those described above with reference to FIGS. 3a-3e will be mounted to an underside of joists 136 in order to assemble a radiant cooling system in corner portion 130 of a framed building structure.

Figure 10B:
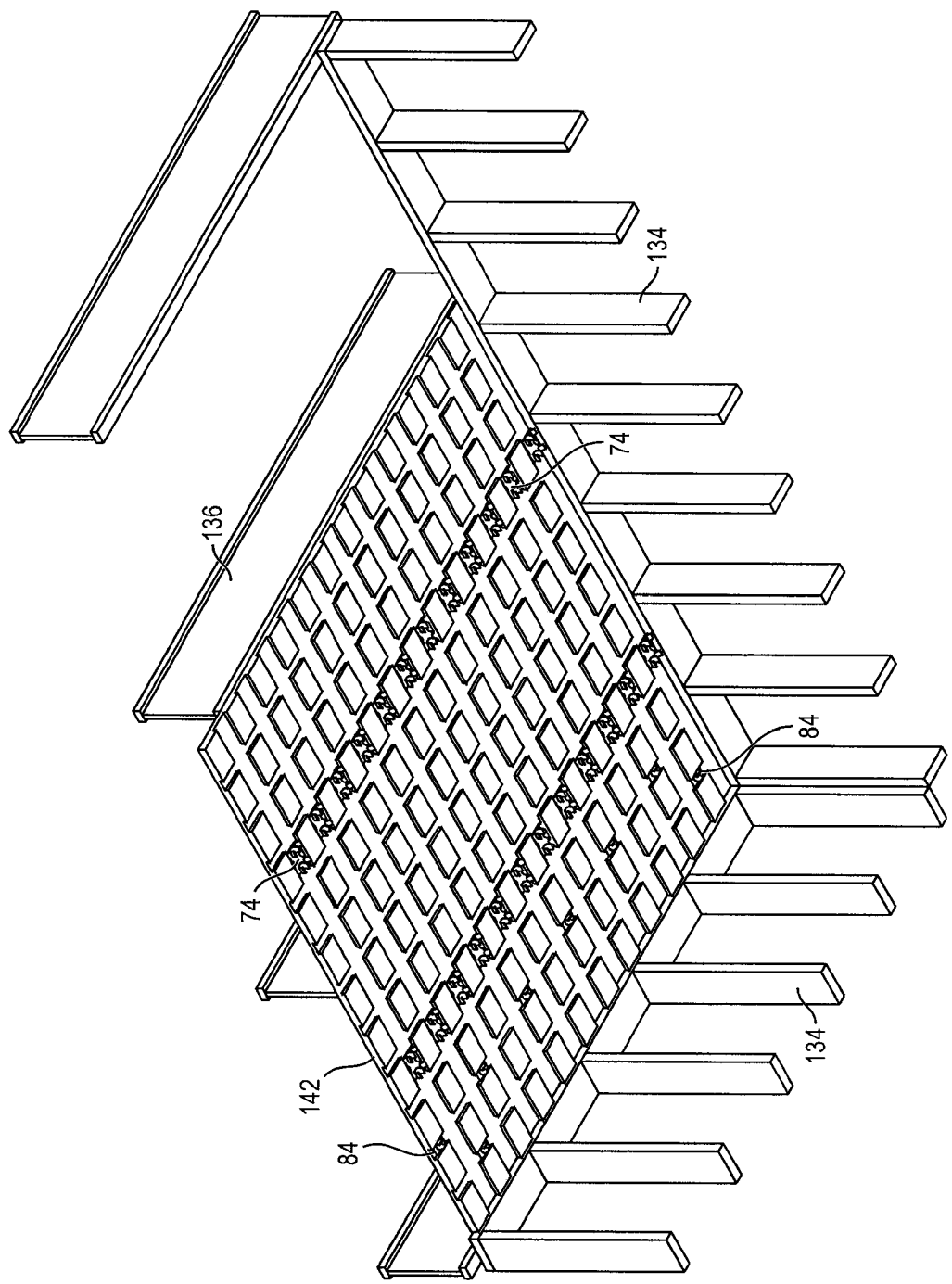

Referring to FIG. 10b, a panel 142 is mounted to an underside of joists 136, at a location where two walls formed by studs 134 meet. Panel 142 is identical to panel 50 that was described above with reference to FIGS. 3a-3e. Retention clips 74, 84 are installed in panel 142 as shown. As mentioned above, for ceiling-mounted systems, retention clips 74, 84 may be conveniently installed at desired locations in panel 142 prior to mounting panel 142 to an underside of joists 136, although retention clips 74, 84 could also be installed after mounting panel 142 to joists 136.

Figure 10C:
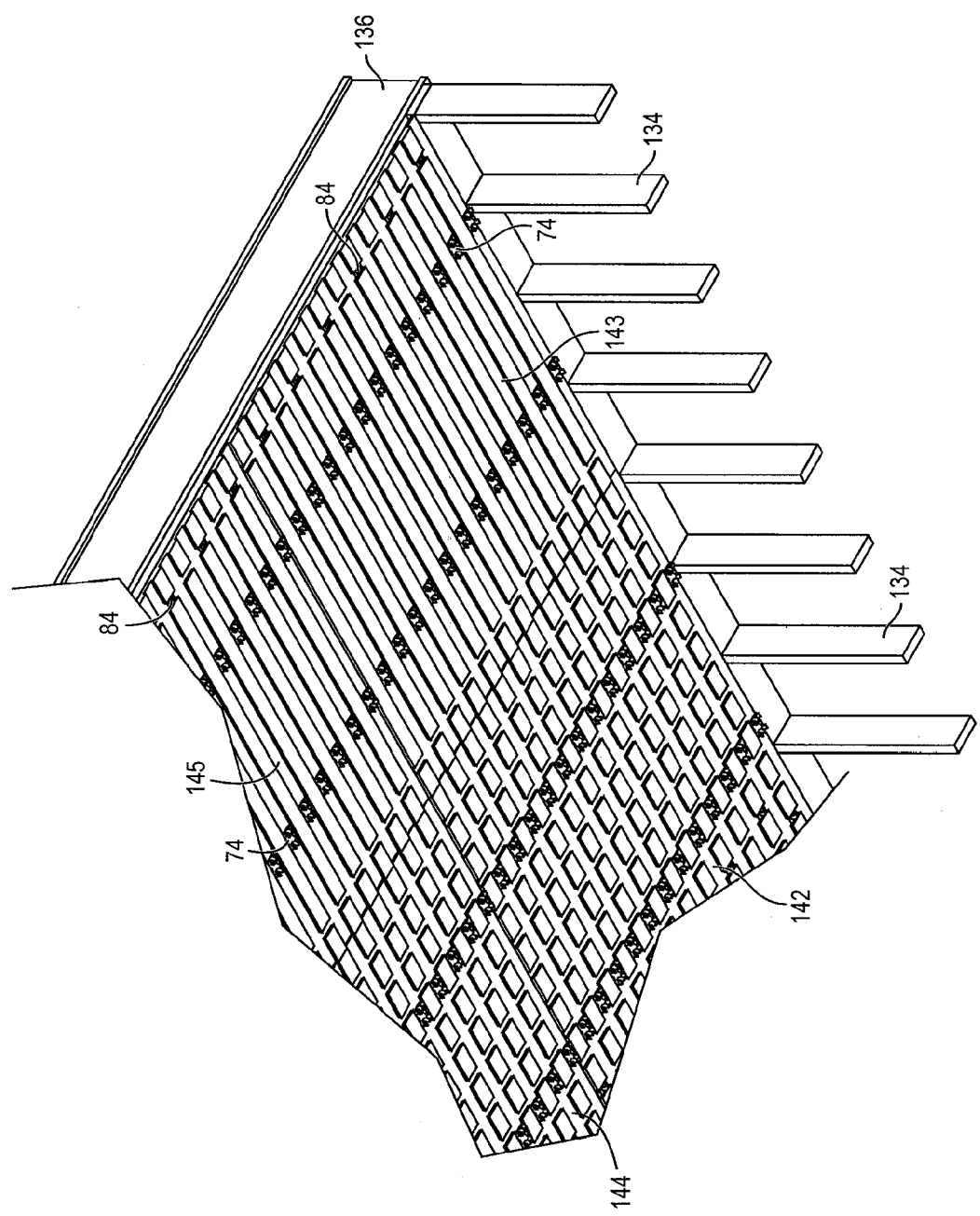

Next, as shown in FIG. 10c, a panel 144 is installed in a position alongside panel 142, also underneath joists 136. Panel 144 is identical to panel 50 that was described above with reference to FIGS. 3a-3e. Retention clips 74, 84 may be installed at desired locations in panel 144 either before or after mounting panel 144 to joists 136, although prior installation is more convenient for ceiling-mounted systems.

Next, as shown in FIG. 10c, a panel 143 is mounted adjacent to panel 142. Panel 143 is identical to panel 10 that was described above with reference to FIGS. 2a-2e. Also, a panel 145 identical to panel 143 is mounted adjacent to panel 144 and panel 143. Panels 143, 145 also include retention clips 74, 84 installed at desired locations. Thus, four panels 142, 143, 144, 145 are attached to an underside of joists 136 to cover a relatively large area.

Figure 10D:
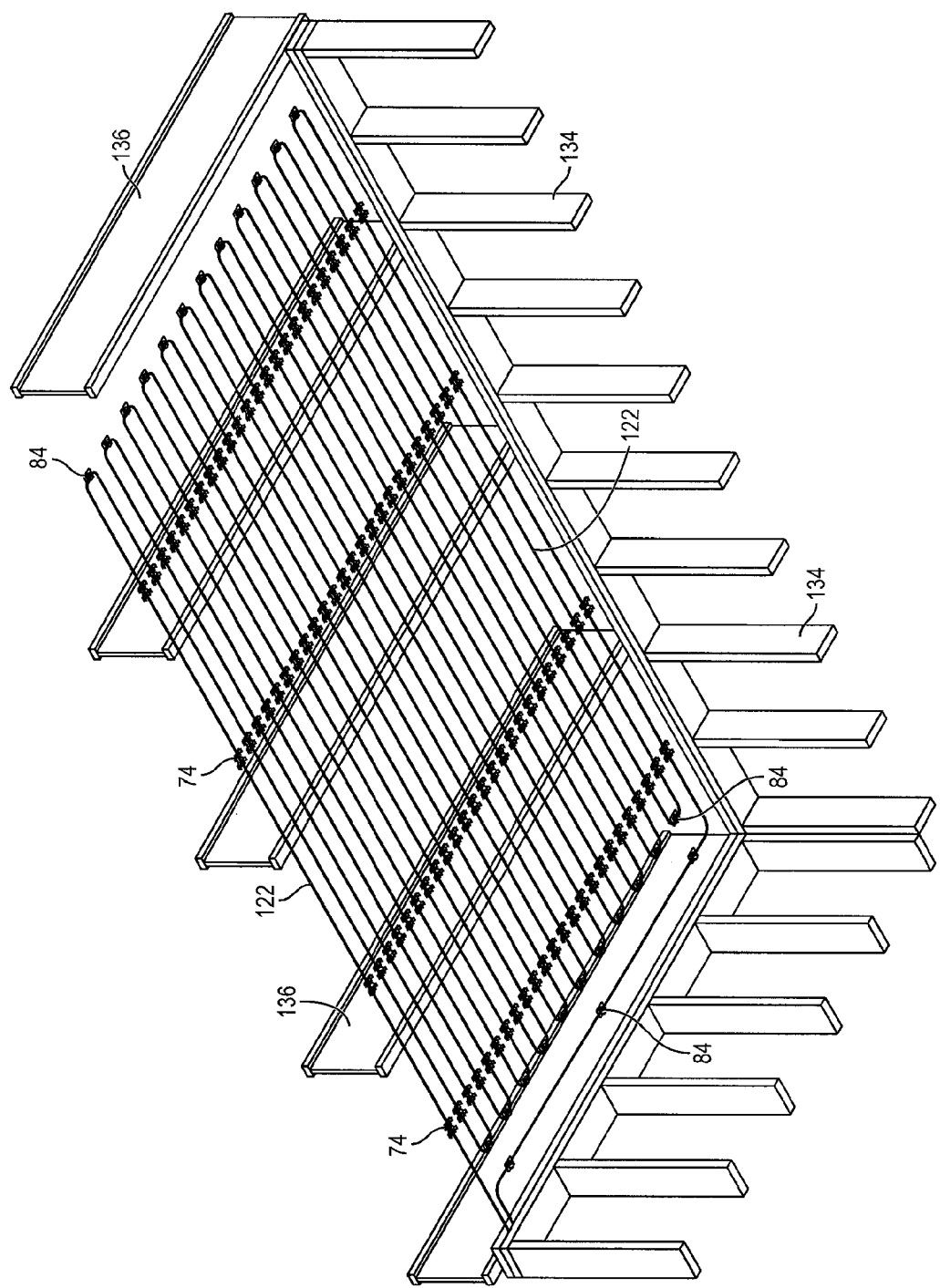

Next, a continuous length of PEX tubing 122 is pushed into retention clips 74, 84 such that PEX tubing 122 is securely held by retention clips 74, 84 and such that PEX tubing 122 is distributed in an area defined by four panels 142-145 according to a desired pattern determined by a location of retention clips 74, 84. FIG. 10d illustrates, without showing panels 142-145, a configuration of retention clips 74, 84 and PEX tubing 122. Supply and return ends of PEX tubing 122 enter and exit a corner of panel 144 that corresponds to region A of FIG. 10a.

Figure 10E:
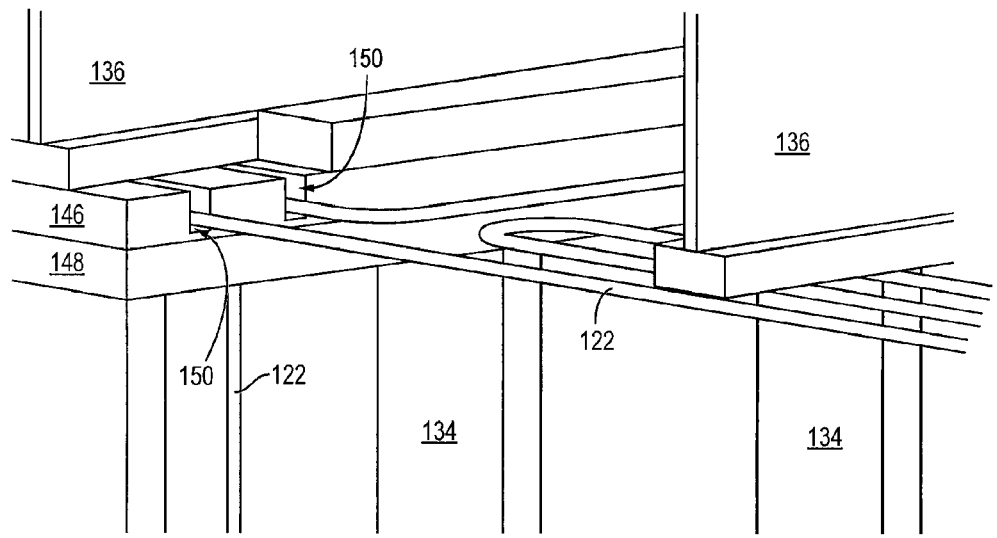
Figure 10F:
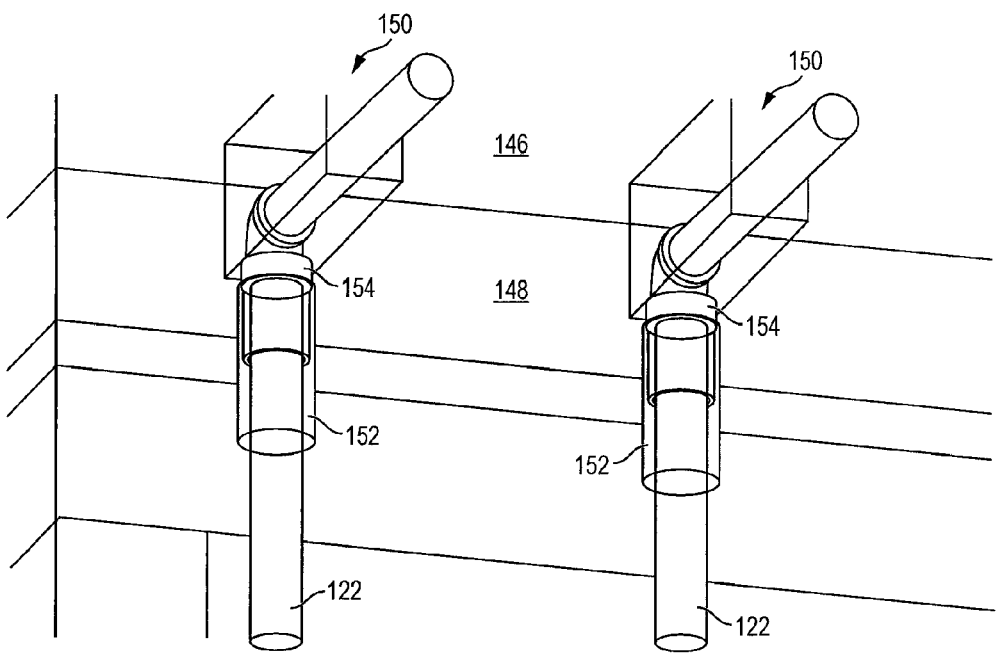

FIG. 10e is a perspective diagram illustrating in expanded detail region A of FIG. 10a with respect to a location of PEX tubing 122. FIG. 10f is another perspective diagram illustrating in expanded detail region A of FIG. 10a with respect to a location of PEX tubing 122. Some components in FIG. 10f are illustrated as being "see-through" in order to more clearly show how supply and return ends of PEX tubing 122 are disposed.

Referring to FIGS. 10e and 10f, PEX tubing 122 is routed through notches 150 that are cut into beam 146. Vertically oriented holes 152 are bored through beam 148 and a lower portion of beam 146 to intersect with an inner end of notches 150, forming L-shaped junctions. L-shaped bend supports 154 are placed at L-shaped junctions of holes 152 and notches 150. Bend supports 154 are hollow and have a circular inner diameter that is slightly larger than an outer diameter of PEX tubing 122. Bend supports 154 provide structural support for PEX tubing 122 as PEX tubing 122 makes a ninety degree turn downwards, preventing PEX tubing 122 from collapsing. As shown in FIGS. 10e and 10f, supply and return ends of PEX tubing 122 are oriented vertically between studs 134 after passing through bend supports 154.

Figure 10G:
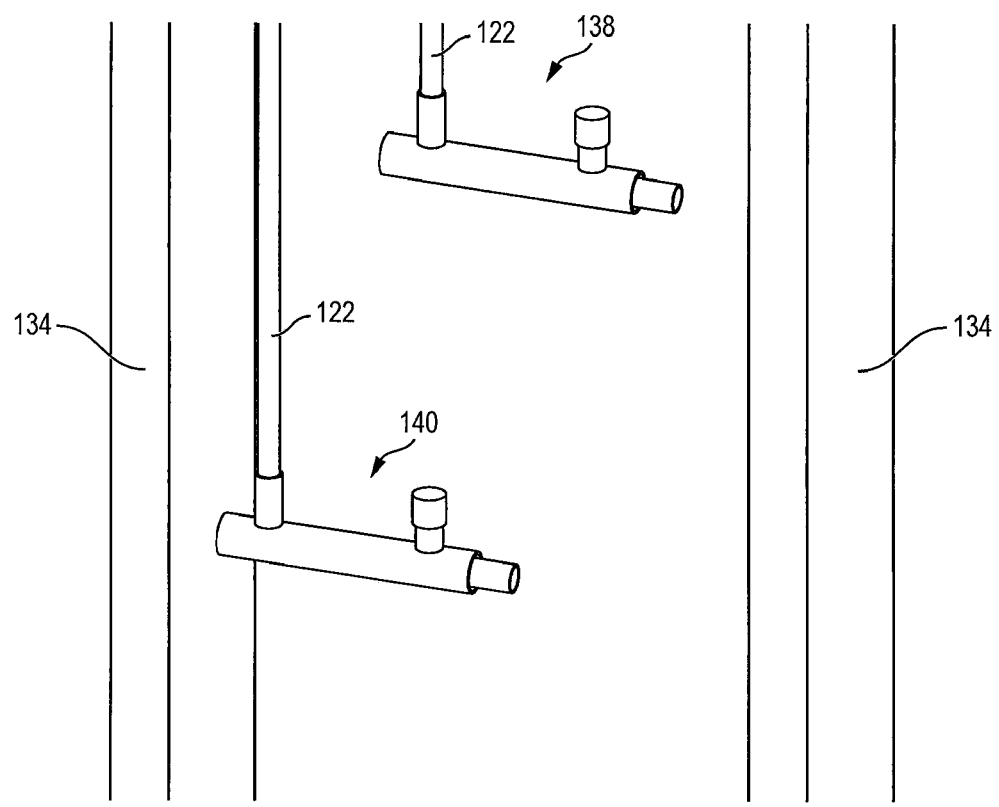

FIG. 10g is a perspective diagram illustrating a connection between supply and return ends of PEX tubing 122 and supply and return manifolds 138, 140. Supply and return manifolds 138, 140 are disposed between studs 134 and are attached to vertically oriented supply and return ends, respectively, of PEX tubing 122. Supply and return ends of PEX tubing 122 were passed through bend supports 154, as shown in FIGS. 10e and 10f. Thus, once a connection is made between PEX tubing 122 and supply and return manifolds 138, 140, a substance such as water or another coolant may be circulated through PEX tubing 122 that is installed in panels 142-145.

Figure 10H:
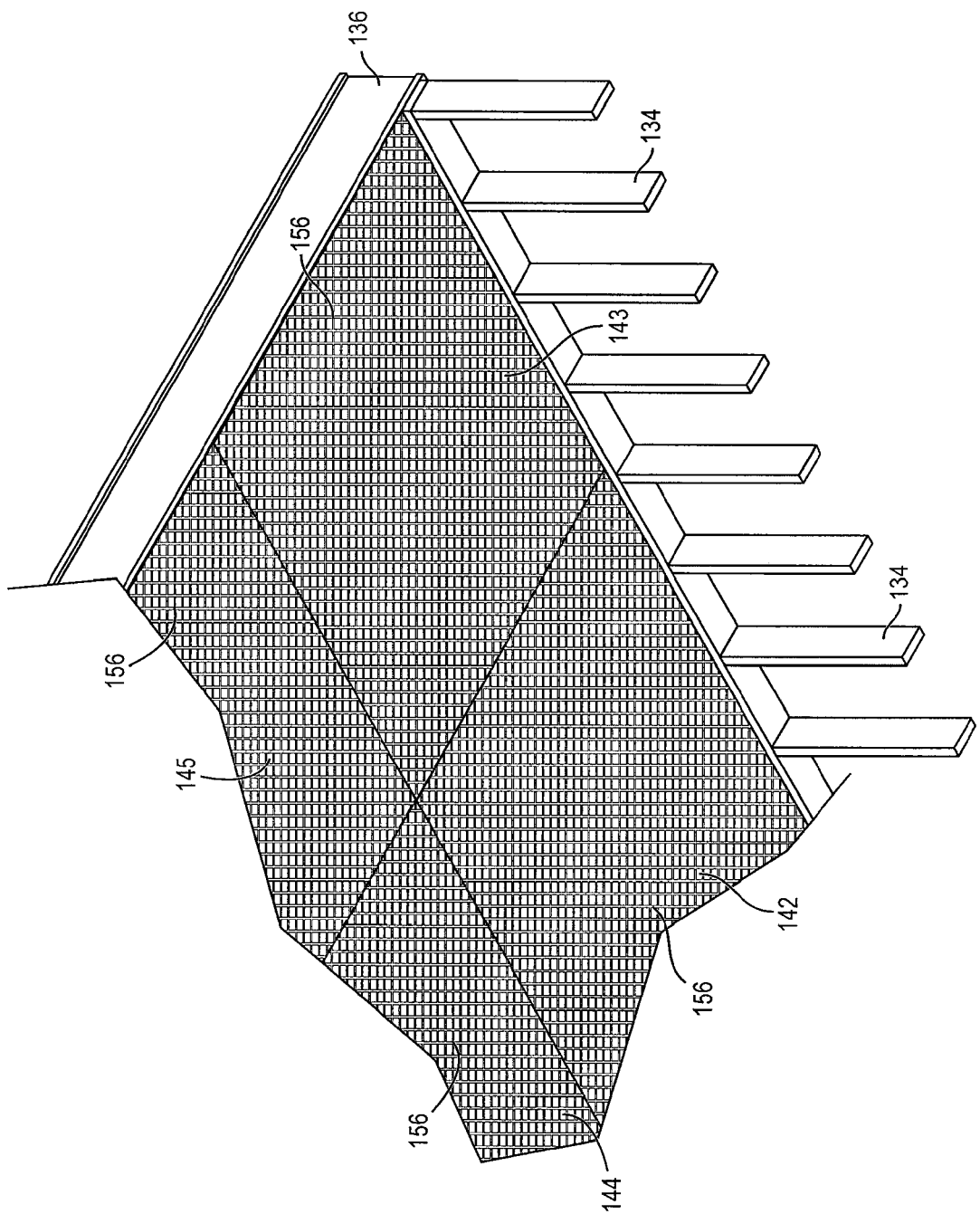
Figure 10I:
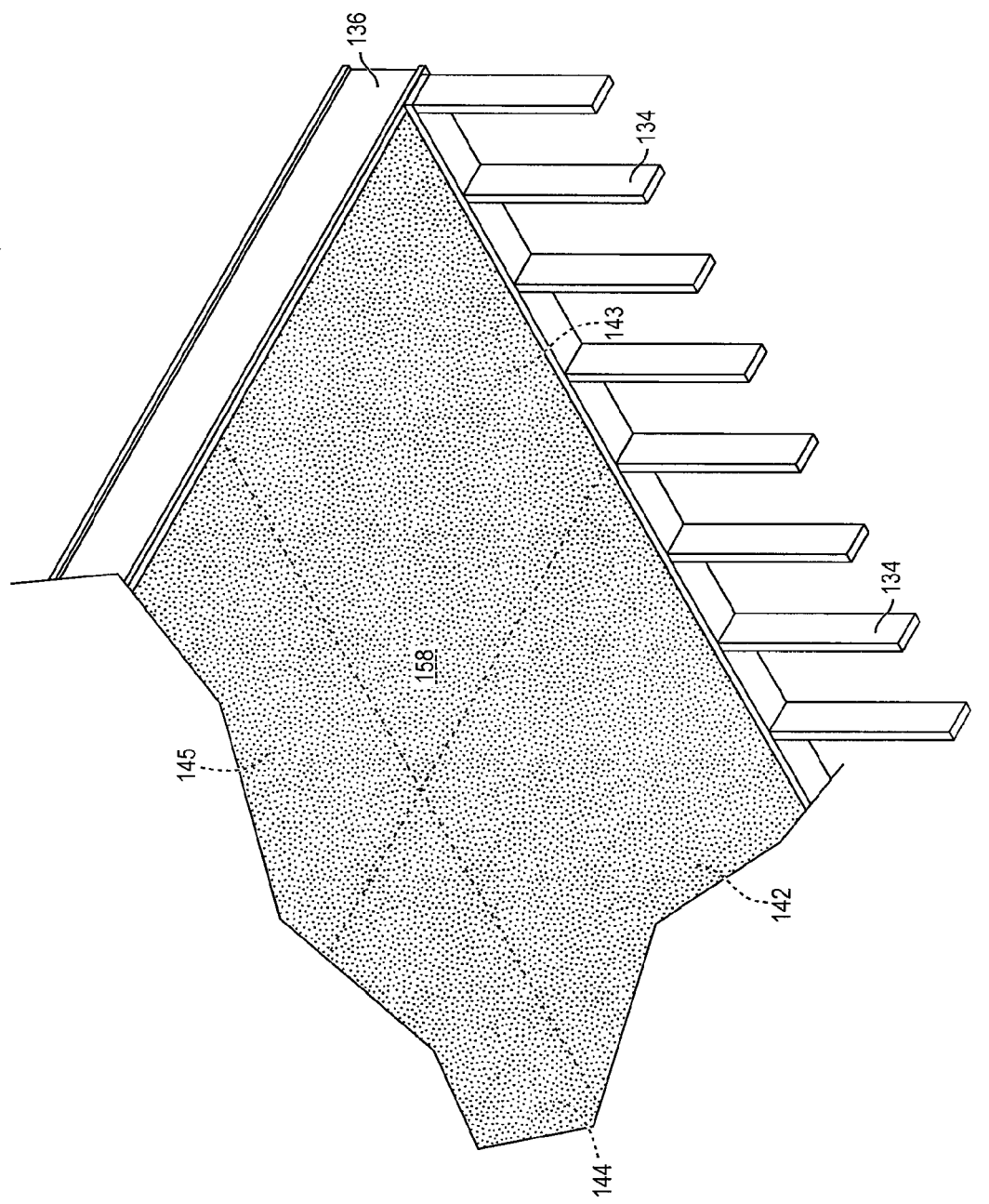

Next, as shown in FIGS. 10h and 10i, sections 156 of metal lath 124 are installed over panels 142-145, similar to what was described above with reference to FIGS. 9c and 9d. After that, a thermal transfer medium 126 such as plaster is applied to fill empty spaces in panels 142-145, and to cover sections 156 of metal lath 124, similar to what was described above with reference to FIGS. 9e and 9f. After thermal transfer medium 126 has set, water or another coolant may be circulated through radiant cooling system 158 using supply and return manifolds 138, 140, in addition to other, un-illustrated components, which are well-understood by those familiar with radiant heating and cooling systems.

Radiant cooling systems, such as the one illustrated in FIGS. 9a-9f and 10a-10i, may cool a ceiling (or floor) of a room by absorbing heat radiated by the rest of the room. In radiant cooling systems, a temperature of a substance (usually water) circulating through PEX tubing 122 is maintained at a temperature that is cooler than the rest of the room. Those of skill in the art will appreciate that a radiant cooling system like one illustrated in FIGS. 9a-9f or 10a-10i may also function as a radiant heating system if a temperature of a substance circulating through PEX tubing 122 is maintained at a temperature that is warmer than the rest of the room. In radiant heating systems, thermal energy is transferred from a substance in PEX tubing 122, to expanded metal lath 124 and thermal transfer medium 126, and radiated from a surface of thermal transfer medium 126 into the rest of the room. As mentioned above, radiant heating systems are usually more efficient if installed on a floor of a room, while radiant cooling systems are usually more efficient if installed on a ceiling of a room. Economic efficiency is achieved by using a single radiant system installed on an interior ceiling for both heating and cooling applications.

In either application (radiant heating or radiant cooling) expanded metal lath 124 conducts thermal energy evenly throughout panel 10. Thermal transfer medium 126 transports thermal energy either from a surface of thermal transfer medium 126 to expanded metal lath 124 and PEX tubing 122 (cooling), or from PEX tubing 122 to expanded metal lath 124 and a surface of thermal transfer medium 126 (heating). PEX tubing 122 may form one or more continuous transport paths for a substance contained within PEX tubing 122. A substance contained within PEX tubing 122 may be actively circulated with pumps or may be passively circulated using convection currents created by a temperature differential that develops within the system. The passive circulation of a substance using natural convection currents created by temperature differential is known as thermal siphoning.

A radiant heating or cooling system, such as the one described above with reference to FIGS. 9a-9f or 10a-10i, or other thermal transfer systems according to other example embodiments, are highly efficient at transferring heat energy for numerous reasons. The feature of suspending a transporter such as PEX tubing 122 within channels 16, 18 and completely embedding PEX tubing 122 within thermal transfer medium 126 provides an increased contact area between thermal transfer medium 126 and PEX tubing 122, thereby boosting thermal conduction efficiency between thermal transfer medium 126 and PEX tubing 122.

Furthermore, expanded metal lath 124, which is in thermal contact with thermal transfer medium 126, is an efficient conductor and can quickly disperse heat energy evenly throughout a thermal transfer system, making a living space adjacent to such a system more comfortable. In some embodiments, a metal lath 124 may not be required because the thermal transfer medium 126 may itself be independently sufficient for dispersing thermal energy throughout a thermal transfer system.

Additionally, as was indicated above with reference to FIG. 7, transporters such as PEX tubing 122 can be uniformly spaced throughout a heat transfer system or conversely, tailored to a meet specific output needs by maximizing output in some areas and minimizing output in others by using variable OC spacing that is a feature of panels in accordance with example embodiments. Thus, panels according to example embodiments may be used to easily and quickly manufacture thermal transfer systems that are capable of rapidly delivering or absorbing heat energy, as well as rapidly responding to changing ambient temperatures.

A system having a structure as illustrated in FIGS. 9a-9f or 10a-10i may be advantageously used in a number of different applications. For example, such a structure installed on an outer surface of an exterior wall with a southerly exposure may constitute part of a solar collector or solar water heater, especially if a thermal transfer medium has a relatively dark color to more effectively absorb solar energy. As another example, such a structure may be installed on an upper surface of an exterior roof or an exterior concrete slab to aid in the melting of snow and ice.

Ceiling mounted systems were described above with reference to FIGS. 9a-9f and 10a-10i. According to other example embodiments, panels may be placed atop prepared grade, earth, gravel, plywood, concrete, or steel suspended in air (for bridging or high rise building applications). For floor mounted systems or any application that may be subjected to heavy loads from people, automobiles, or accumulated snow, different materials for some of the components of the panels and systems described above may be required, or some components may need to be eliminated.

For example, a thermal transfer medium such as plaster or stucco, while a good choice for wall and ceiling mounted systems, may not be ideal for floor mounted systems due to durability concerns. Other materials such as concrete, packed earth, or sand may instead be substituted for the plaster or stucco. The layer of concrete or packed earth may serve as a support surface for other flooring materials such as, e.g., carpet, brick, asphalt, tile, wood or laminate flooring, etc.

For radiant heating, radiant cooling, and solar collecting applications, a purpose of a thermal transfer medium is to efficiently conduct heat energy either from embedded PEX tubing to a surface of the thermal transfer medium and/or a metal lath, or from a surface of the thermal transfer medium and/or a metal lath to embedded PEX tubing. As such, there are many other known materials, too many to list here, that may also perform adequately as a thermal transfer medium according to alternative embodiments.

As another example, in floor mounted systems, an insulating layer comprising or consisting of thermofusible expanded foam may be too compressible to adequately protect PEX tubing embedded within channels in a panel from becoming flattened as people and/or vehicles pass overhead. A material with more structural strength and rigidity than a thermofusible expanded foam may be required, even if using something other than a thermofusible expanded foam reduces insulating effectiveness. For example, an insulating material made of relatively hard rubber (e.g., recycled automobile tires) could be used to form panels having channels in accordance with alternative embodiments.

As another example, even concrete might be used as an insulating material to form a panel in which channels are formed, even though an insulating effectiveness of the concrete is about the same as a thermal transfer medium that is used to fill the channels (which may also be concrete). For example, when concrete is used as an insulating material, an optional backing board (e.g., backing board 14 that was described above with reference to FIGS. 2b-2d) may be replaced with a thin layer of plywood, which will have more insulating effectiveness than concrete alone.

Panels according to example embodiments may also be included in other systems besides radiant heating, radiant cooling, and solar collection systems. For example, panels such as panels 10 and 50 could be arranged to create hollow forms for pouring concrete walls. First channels 16 and second channels 18 of the panels 10 and 50, along with appropriately sized retention clips (such as retention clips 74 or 84), could be used to hold concrete reinforcing bar (rebar) while concrete was poured into the forms. As another example, panels (such as panels 10 and 50) could be used to implement electrical raceway panels for organizing connections of electrical systems within a structure. For electrical raceway embodiments, a thermal transfer medium (such as thermal transfer medium 126 of FIGS. 9a-9f) and a heat dissipater (such as expanded metal lath 124 of FIGS. 9a-9f) would not be required.

Another example system according to an example embodiment is a system of panels mounted on a roof of a structure, with means for adjusting an angle of a panel relative to the sun. During the day, panels of such a system could be adapted to be maintained at a constant ninety degree angle relative to the sun to maximize absorption of solar radiation. During the night, panels of such a system could be maintained perpendicular to deep space (facing straight up) to transfer heat from an interior of a structure and dissipate interior heat to the night sky. This is similar to the arrangement shown for panels 208 of FIG. 1a, although an angle of panels 208 cannot be adjusted.

Another example system might be to place panels such as panels 10 or 50 below ground level, place tubing in channels, and bury panels 10, 50. Heat could be applied via the tubing to warm the covering soil and extend the growing season. In a slight modification to this system, perforated tubing may be used instead to deliver water and nutrients to growing plants, reducing atmospheric evaporation. In another agricultural example, panels 10, 50, could be placed at the bottom of a hydroponic trough in order to warm or cool the water for the benefit of plant growth stimulation, or to deliver nutrients to benefit plant growth.

Another example system might be to bury a number of panels 10, 50 below ground in order to cool heated water in the PEX tubing. The cooled water could then be pumped to a radiant cooling system made of similar panels 10, 50 inside an interior of a structure. Another example system might be to bury panels channel-side up around a perimeter of a building. The panels would include perforated tubing that could periodically deliver an insecticide designed to kill termites to the soils surrounding the structure.

Another example system might be a number of panels having channels filled with a phase-change material such as a wax or a salt that is bound in a medium such as sawdust or sand. A phase-change material absorbs heat energy to accomplish phase transformation and can later release this energy when it resolidifies, for use in another process. Since the phase change material is bound in a medium such as sawdust or sand, it does not necessarily flow away at the melting temperature.

Another example system might be used with any household appliance that generates a significant amount of heat, such as, e.g., a refrigerator or clothes dryer. A panel could be placed channel-side up and filled with concrete for the thermal transfer medium. Heat generated by the appliance could be collected and moved to where it was needed (e.g., domestic hot water) or dissipated to atmosphere and thereby lowering the air-conditioning bill.

Another example system might be one or more panels 10, 50 placed channel side up with PEX tubing 100 in the channels 16, 18. The channels 16, 18 could be filled with concrete or some other appropriate thermal transfer medium, and then panels could be covered with composting material. Heat generated by a composting process can be collected and supplied to another panel embedded in another thermal transfer medium to drive another process, such as, e.g., radiant thermal heating.

Another example system might be to attach panels 10, 50, having tubing and a thermal transfer medium to a backside of photovoltaic (PV) panels. The system could collect excess heat and increase a performance of the PV panels.

Another example system might be to line an interior of a hot tub with panels that are capable of dissipating heat generated by solar or mechanical means into the water inside the hot tub. Another similar example system might be carried over to swimming pool construction, where panels lining an interior of the pool could also be used to dissipate heat generated by solar or mechanical means. Still another similar example system might be found in fish hatchery troughs, where water temperatures could be solar produced and regulated.

Based on the briefly-described examples given above, it should be evident that panels according to example embodiments are not limited only to the structurally-related applications that are illustrated in FIG. 1a. Rather, heat transfer systems incorporating panels in accordance with example embodiments can be used it any number of applications for absorbing, conducting, or radiating thermal energy.

While one or more example embodiments have been illustrated and described in detail, the skilled artisan will appreciate that modifications and adaptations to those embodiments may be made without departing from the scope of the present invention as set forth in the following claims.

What is claimed is:

1. A panel comprising:
   an insulating material;
   first channels disposed in a first surface of the insulating material;
   a first retention clip disposed in one of the first channels and including a base portion comprising a spur disposed at a distal end of the base portion and an angled part extending away from the base portion; and
   second channels disposed in the first surface of the insulating material and disposed at a first angle relative to the first channels and including a surface with a first width and an opening opposite the surface with a second width less than the first width.

2. The panel of claim 1, wherein the first retention clip comprises a "C"-shaped portion attached to a flat part of the base portion such that an opening of the "C"-shaped portion faces away from the base portion, the first retention clip adapted to be inserted into the one of the first channels such that the flat part of the base portion contacts a bottom of the one of the first channels, such that the angled part of the base portion engages a wall of the one of the first channels, and such that the "C"-shaped portion extends upwards into the one of the first channels.

3. The panel of claim 1, further comprising a second retention clip disposed within one of the second channels, the second retention clip configured to suspend an object within the one of the second channels and to prevent the object from contacting walls of the one of the second channels.

4. The panel of claim 3, wherein the second retention clip comprises:
a base portion that is substantially flat; and
a "C"-shaped portion attached to the base portion such that an opening of the "C"-shaped portion faces away from the base portion, the first retention clip adapted to be slidably inserted into the one of the second channels such that the base portion contacts a bottom of the one of the second channels and the "C"-shaped portion extends upwards into the one of the second channels.

5. The panel of claim 1, wherein the first channels are spaced uniformly across a width of the panel.

6. The panel of claim 5, wherein the second channels are spaced uniformly across a length of the panel.

7. The panel of claim 1, wherein the first channels in the panel outnumber the second channels in the panel.

8. A panel, comprising:
an insulating material;
a plurality of first channels disposed in a first surface of the insulating material, the first channels being substantially parallel;
a plurality of second channels disposed in the first surface of the insulating material and intersecting the first channels at an angle, the second channels being substantially parallel and including a surface with a first width and an opening opposite the surface with a second width less than the first width; and
a clip disposed in the second channels including a base portion comprising a third width greater than the second width with sidewalls of the second channels retaining the clip in the second channels.

9. The panel of claim 8, wherein a shape of a cross-section of the first channels in a direction perpendicular to a length of the first channels is that of a quadrilateral having at least one pair of parallel sides.

10. The panel of claim 9, wherein the shape is that of a trapezoid having exactly one pair of parallel sides, the first channels arranged such that a shorter one of the parallel sides is substantially coplanar with the first surface of the insulating material.

11. The panel of claim 9, wherein the shape is that of a quadrilateral having two pairs of parallel sides.

12. The panel of claim 8, further comprising a backing board disposed on a second surface of the insulating material, the second surface of the insulating material opposite the first surface of the insulating material.

13. The panel of claim 8, wherein the insulating material comprises thermofusible expanded foam.

14. A panel, comprising:
an insulating material;
a first channel formed in the insulating material;
a second channel formed in the insulating material and intersecting the first channel;
a first clip disposed in the first channel and engaging sidewalls of the first channel with the sidewalls of the first channel overhanging the first clip and enclosing an end of the first clip; and
a transporter disposed in the first and second channels with the first clip holding the transporter in the first channel.

15. The panel of claim 14, wherein the first and second channels intersect at a right angle.

16. The panel of claim 14, further including:
a lath disposed over the first channels and second channels to cover the transporter; and
a thermal transfer medium disposed within the first or second channels and thermally connected to the transporter.

17. The panel of claim 14, wherein the clip includes multiple clip portions.

18. The panel of claim 14, wherein the first clip is held in the first channel by sidewalls of the first channel.

19. The panel of claim 14, further including a second clip disposed in the second channel and configured to hold the transporter in the second channel.

20. A panel, comprising:
an insulating material;
a first channel formed in the insulating material;
a second channel formed in the insulating material and intersecting the first channel;
a first clip disposed in the first channel and including a base portion comprising an angled portion extending upwards and outwards from the base portion to engage a sidewall of the first channel; and
a transporter disposed in the first and second channels with the first clip holding the transporter in the first channel.

21. The panel of claim 20, wherein the first and second channels intersect at a right angle.

22. The panel of claim 20, further including:
a lath disposed over the first channels and second channels to cover the transporter; and
a thermal transfer medium disposed within the first or second channels and thermally connected to the transporter.

23. The panel of claim 20, wherein the clip includes multiple clip portions.

24. The panel of claim 20, wherein the first clip is held in the first channel by sidewalls of the first channel.

25. The panel of claim 20, further including a second clip disposed in the second channel and configured to hold the transporter in the second channel.

* * * * *